US012733007B2

(12) United States Patent
Liang et al.

(10) Patent No.: US 12,733,007 B2
(45) Date of Patent: Sep. 8, 2026

(54) METHOD, USER EQUIPMENT, AND AN ACCESS NETWORK NODE

(71) Applicant: NEC Corporation, Tokyo (JP)

(72) Inventors: Caroline Liang, Guildford (GB); Robert Arnott, London (GB)

(73) Assignee: NEC CORPORATION, Tokyo (JP)

( * ) Notice: Subject to any disclaimer, the term of this patent is extended or adjusted under 35 U.S.C. 154(b) by 341 days.

(21) Appl. No.: 18/284,599

(22) PCT Filed: Mar. 17, 2022

(86) PCT No.: PCT/JP2022/012482
§ 371 (c)(1),
(2) Date: Sep. 28, 2023

(87) PCT Pub. No.: WO2022/210002
PCT Pub. Date: Oct. 6, 2022

(65) Prior Publication Data
US 2024/0179716 A1 May 30, 2024

(30) Foreign Application Priority Data
Apr. 1, 2021 (GB) ..................................... 2104787

(51) Int. Cl.
*H04W 72/23* (2023.01)
*H04L 1/1812* (2023.01)

(52) U.S. Cl.
CPC ........... *H04W 72/23* (2023.01); *H04L 1/1812* (2013.01)

(58) Field of Classification Search
CPC ... H04L 1/1614; H04L 1/1812; H04L 1/1854; H04L 1/1861; H04L 1/1896; H04L 5/001;
(Continued)

(56) References Cited

U.S. PATENT DOCUMENTS 10,411,847 B2 * 9/2019 Liu ....................... H04W 72/51
10,924,228 B2 * 2/2021 Liu ....................... H04L 5/0098
(Continued)

FOREIGN PATENT DOCUMENTS

CN 114175543 A * 3/2022 ........... H04L 1/1861
CN 114982176 A * 8/2022 ............ H04L 5/001
(Continued)

OTHER PUBLICATIONS

International Search Report for PCT Application No. PCT/JP2022/012482, mailed on Jun. 10, 2022.
(Continued)

*Primary Examiner* — Eric Nowlin

(57) ABSTRACT

A method is disclosed in which a UE communicates with a RAN node in a set of cells. The UE receives, from the RAN node, control information for scheduling resources for a respective shared channel in each of at least two cells of the set of cells. The respective control information for each of the at least two cells of the set of cells is received in a single scheduling downlink control information (DCI) transmission. The UE respectively communicates with the RAN node in each of the at least two cells of the set of cells using the corresponding shared channel resources scheduled via the single scheduling DCI transmission. The scheduling DCI includes a DCI field, and the DCI field carries information for identifying each cell, of the at least two cells of the set of cells, for which resources for a respective shared channel have been scheduled.

10 Claims, 16 Drawing Sheets

(58) Field of Classification Search
CPC ..... H04L 5/003; H04L 5/0048; H04L 5/0051; H04L 5/0055; H04L 5/0094; H04W 72/20; H04W 72/23
See application file for complete search history.

(56) References Cited

U.S. PATENT DOCUMENTS 11,425,724 B2 * 8/2022 Liu ..................... H04W 72/51
11,564,247 B2 * 1/2023 Xu ..................... H04L 5/0042
11,632,787 B2 * 4/2023 Xu ..................... H04W 16/32
370/329
12,096,420 B2 * 9/2024 Zewail ................ H04L 27/2666
12,289,168 B2 * 4/2025 Yuan ................... H04L 1/1896
12,395,284 B2 * 8/2025 Cao ..................... H04W 72/21
12,471,103 B2 * 11/2025 Kang ................... H04L 5/0051
12,500,703 B2 * 12/2025 Baldemair ............ H04L 1/1861
2016/0302203 A1 * 10/2016 Liu ..................... H04L 5/0098
2017/0215202 A1 * 7/2017 Yang ................... H04W 72/20
2019/0372726 A1 * 12/2019 Liu ..................... H04W 72/51
2020/0328849 A1 * 10/2020 Noh ..................... H04L 1/1812
2021/0014851 A1 * 1/2021 Liu ..................... H04L 5/0053
2021/0105780 A1 * 4/2021 Jin ...................... H04L 5/0098
2021/0258996 A1 * 8/2021 Xu ...................... H04W 16/32
2021/0258999 A1 * 8/2021 Xu ...................... H04L 5/001
2021/0410119 A1 * 12/2021 Takeda ................ H04W 72/23
2022/0247525 A1 * 8/2022 Cao ..................... H04L 1/1664
2023/0030642 A1 * 2/2023 Yuan ................... H04L 5/001
2023/0059731 A1 * 2/2023 Yuan ................... H04W 72/1273
2023/0069308 A1 * 3/2023 Zhu ..................... H04L 5/001
2023/0134318 A1 * 5/2023 Kang ................... H04W 72/232
370/329
2023/0164792 A1 * 5/2023 Cheng .................. H04W 72/23
370/329
2023/0217458 A1 * 7/2023 Bang ................... H04W 48/12
370/329
2023/0276441 A1 * 8/2023 Wang ................... H04W 72/23
370/329
2023/0291509 A1 * 9/2023 Baldemair ............ H04L 1/1861
2023/0337256 A1 * 10/2023 Takeda ................ H04W 72/232
2024/0204931 A1 * 6/2024 Xiong .................. H04L 5/0053
2025/0106773 A1 * 3/2025 Zhou ................... H04L 5/0035
2025/0274930 A1 * 8/2025 Shim ................... H04L 1/1819

FOREIGN PATENT DOCUMENTS

CN 114982176 B * 3/2024 .......... H04L 5/0055
CN 114175543 B * 4/2024 .......... H04L 1/1861
CN 114080768 B * 5/2024 .......... H04L 1/1861
EP 4008073 A1 * 6/2022 .......... H04L 1/1861
EP 4008073 B1 * 11/2024 .......... H04L 1/1861
EP 4104604 B1 * 2/2025 .......... H04W 72/044
EP 4091256 B1 * 5/2025 .......... H04L 5/0092
JP 2011-142454 A 7/2011
WO 2017/078159 A1 5/2017
WO WO-2021011162 A1 * 1/2021 .......... H04W 72/23
WO WO-2021016976 A1 * 2/2021 .......... H04L 1/1861
WO WO-2021142755 A1 * 7/2021 .......... H04L 1/1822
WO WO-2021162768 A1 * 8/2021 .......... H04W 72/23
WO WO-2021162858 A1 * 8/2021 .......... H04W 72/23
WO WO-2023201149 A1 * 10/2023 .......... H04L 1/1861
WO WO-2023209184 A1 * 11/2023 .......... H04L 1/1861
WO WO-2025007568 A1 * 1/2025 .......... H04L 5/0055

OTHER PUBLICATIONS

Written opinion for PCT Application No. PCT/JP2022/012482, mailed on Jun. 10, 2022.
NGMN 5G White Paper' V1.0 by the Next Generation Mobile Networks (NGMN) Alliance, Feb. 17, 2015, URL: https://www.ngmn.org/5g-white-paper.html.
3GPP TR 38.822 V15.0.1 (Jul. 2019), "3rd Generation Partnership Project; Technical Specification Group Radio Access Network; NR; User Equipment (UE) feature list (Release 15)".
Huawei et al: "Downlink resource allocation for B5C", 3GPP Draft; R1-151856, Apr. 19, 2015.
ZTE: "Discussion on Multi-cell PDSCH Scheduling via a Single DCI", 3GPP Draft; R1-2101789, Jan. 25, 2021.
Mediatek Inc: "On Multi-cell PDSCH Scheduling via Single DCI", 3GPP Draft; R1-2100611, Jan. 19, 2021.
JP Office Action for JP Application No. 2023-560183, mailed on Oct. 1, 2024 with English Translation.
CATT, "Discussion on multi-cell PDSCH scheduling via a single DCI", 3GPP TSG RAN WG1 #104-e R1-2100359, Jan. 19, 2021, pp. 1-pp. 15.
NTT Docomo, Inc., "Discussion on multi-cell PDSCH scheduling via a single DCI for NR DSS", 3GPP TSG RAN WG1 #104-e R1-2101633, Jan. 18, 2021, pp. 1-pp. 5.
Lenovo, Motorola Mobility, "On support of multi-cell joint scheduling in Rel-17 DSS", 3GPP TSG RAN #91e RP-210449, Mar. 15, 2021, pp. 1-pp. 3.

* cited by examiner

PDCCH - e.g. 1, 2, 4, 8, 16 CCEs (depending on aggregation level)

Control Channel Elements (CCEs) – e.g. 1, 2 or 3 REG Bundles

REG Bundles – e.g. 2, 3 or 6 REGs

Resource Element Groups (REGs)

Resource Element(s) (REs)

Fig. 4
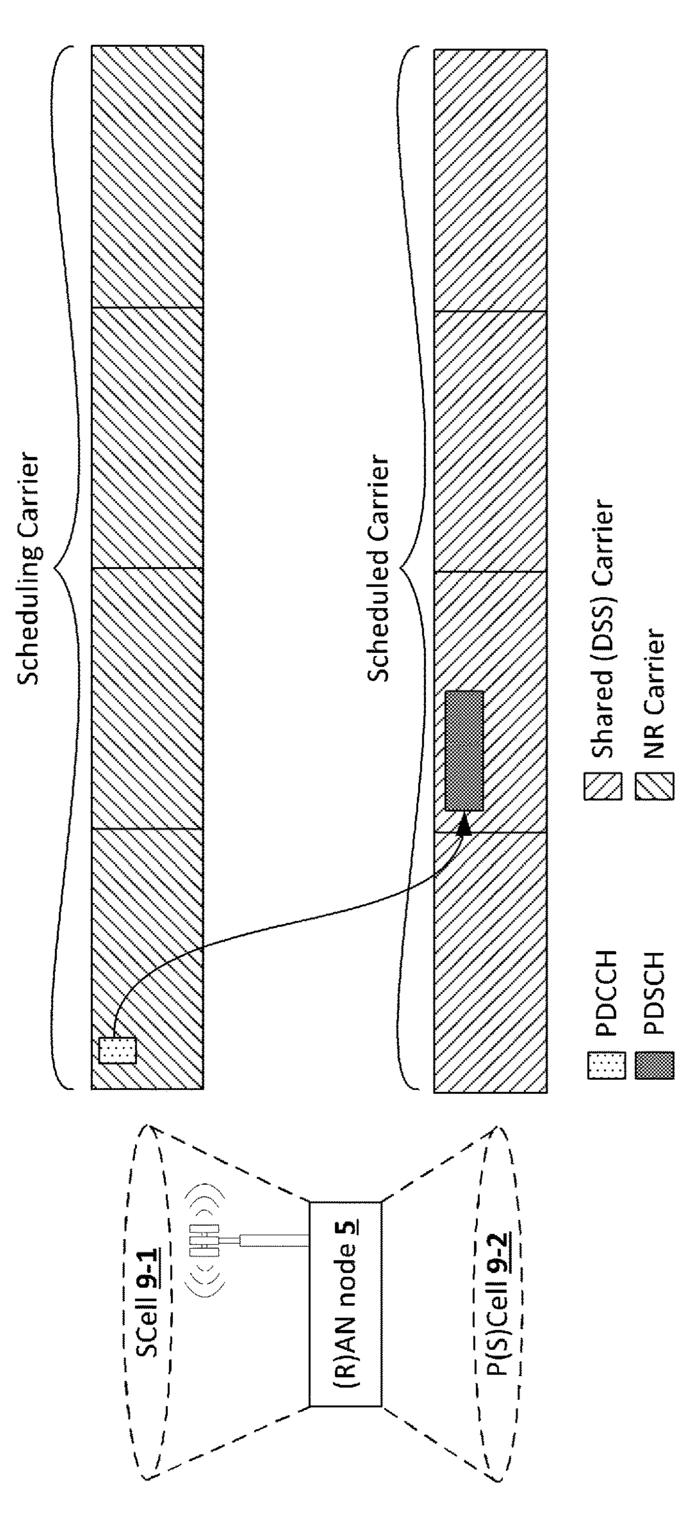
Scheduling Carrier
Scheduled Carrier
PDCCH
PDSCH
Shared (DSS) Carrier
NR Carrier
SCell 9-1
(R)AN node 5
P(S)Cell 9-2

Four Active / Schedulable Carriers

| CIF Value (Dec) | 0 | 1 | 2 | 3 | 4 | 5 | 6 | 7 |
|---|---|---|---|---|---|---|---|---|
| CIF Value (Bin) | 000 | 001 | 010 | 011 | 100 | 101 | 110 | 111 |
| Scheduled Carriers | 0, 1 | 0, 2 | 0, 3 | 1, 2 | 1, 3 | 2, 3 | *Reserved* | *Reserved* |

More than four Active / Schedulable Carriers

| Higher layer configurable mapping table | |
|---|---|
| Carrier Configuration # | Allowable Carrier Combination |
| 1 | $CC_{11}$, $CC_{12}$ |
| 2 | $CC_{21}$, $CC_{22}$ |
| 3 | $CC_{31}$, $CC_{32}$ |
| 4 | $CC_{41}$, $CC_{42}$ |
| 5 | $CC_{51}$, $CC_{52}$ |
| 6 | $CC_{61}$, $CC_{62}$ |
| 7 | $CC_{71}$, $CC_{72}$ |
| 8 | $CC_{81}$, $CC_{82}$ |

Configured at UE by higher layer signalling

Eight Allowable Carrier Combinations

| CIF Value (Dec) | 0 | 1 | 2 | 3 | 4 | 5 | 6 | 7 |
|---|---|---|---|---|---|---|---|---|
| CIF Value (Bin) | 000 | 001 | 010 | 011 | 100 | 101 | 110 | 111 |
| Carrier Configuration # | 1 | 2 | 3 | 4 | 5 | 6 | 7 | 8 |

Three Carriers Eligible for Multi-cell Scheduling

| CIF Value | 000 | 001 | 010 | 011 | 100 | 101 | 110 | 111 |
|---|---|---|---|---|---|---|---|---|
| Scheduled Carriers | *Reserved* | *Reserved* | *Reserved* | $CC_1$, $CC_2$ | *Reserved* | $CC_3$, $CC_1$ | $CC_3$, $CC_2$ | *Reserved* |

METHOD, USER EQUIPMENT, AND AN ACCESS NETWORK NODE

This application is a National Stage Entry of PCT/JP2022/012482 filed on Mar. 17, 2022, which claims priority from British Patent Application 2104787.3 filed on Apr. 1, 2021, the contents of all of which are incorporated herein by reference, in their entirety.

TECHNICAL FIELD

The present invention relates to a communication system.

BACKGROUND ART

The invention has particular but not exclusive relevance to wireless communication systems and devices thereof operating according to the 3rd Generation Partnership Project (3GPP) standards or equivalents or derivatives thereof (including LTE-Advanced and Next Generation or 5G networks). The invention has particular, although not necessarily exclusive relevance to, improved apparatus and methods that support scheduling of shared channel (e.g. a physical downlink shared channel (PDSCH) or a physical uplink shared channel (PUSCH)) resources in particular, but not limited to, the scheduling of shared channel resources in more than one cell at the same time.

Recent developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core network.

Under the 3GPP standards, a NodeB (or an eNB in LTE, gNB in 5G) is the base station (or 'radio access network (RAN) node') via which communication devices (referred to as user equipments or 'UEs') connect to a core network and communicate with other communication devices or remote servers. For simplicity, the present application will use the term base station, RAN node or simply, or simply 'RAN' to refer to any such equipment or equivalent apparatus for providing access to the network.

In the current 5G architecture, for example, the gNB structure may be split into two parts known as the Central Unit (CU) and the Distributed Unit (DU), connected by an F1 interface. This enables the use of a 'split' architecture, whereby the, typically 'higher', CU layers (for example, but not necessarily or exclusively), PDCP) and the, typically 'lower', DU layers (for example, but not necessarily or exclusively, RLC/MAC/PHY) to be implemented separately. Thus, for example, the higher layer CU functionality for a number of gNBs may be implemented centrally (for example, by a single processing unit, or in a cloud-based or virtualised system), whilst retaining the lower layer DU functionality locally separately in each gNB.

For simplicity, the present application will use the term mobile device, user device, or UE to refer to any communication device that is able to connect to the core network via one or more base stations. Although the present application may refer to 'mobile' devices in the description, it will be appreciated that the technology described can be implemented on any communication devices (mobile and/or generally stationary) that can connect to a communications network for sending/receiving data, regardless of whether such communication devices are controlled by human input or software instructions stored in memory.

With the increasing usage of mobile communications for a wide range of different use cases, additional frequencies and bands are needed to accommodate this increasing demand. Accordingly, a variety of different frequency bands are available for 5G NR. These frequency bands include many of the existing frequency bands used by previous generations of telecommunication technology and many new frequency bands including bands in the millimetre wave region. The bandwidth available for frequency bands in the millimetre wave region is very much higher than for frequency bands used by earlier generations and thus allow for greater data speeds to be achieved albeit at the expense of the range of the signals.

The available frequency bands are grouped into two different frequency ranges referred to as frequency range 1 (FR1) containing the lower frequency bands and frequency range 2 (FR2) containing the higher frequency bands.

FR1 bands are likely to carry much of the traditional cellular mobile communications traffic whereas the FR2 bands are aimed at providing short range very high data rate capability for 5G radio. Originally the FR1 band was intended to define bands below 6 GHz, but with anticipated additional spectrum allocations, the FR1 range has now been extended to 7.125 GHZ.

Both LTE and 5G NR support carrier aggregation (CA) in which a number of different blocks of frequency are combined to enable the system to provide an enhanced bandwidth. Each aggregated carrier is referred to as a component carrier (CC). In LTE the component carriers could have a bandwidth of 1.4, 3, 5, 10, 15 or 20 MHz and a maximum of five component carriers could be aggregated providing for a maximum aggregated bandwidth is 100 MHz. Currently, in 5G up to 16 component carriers can be aggregated using various combinations of inter-band and intra-band carrier aggregation.

Carrier aggregation can involve the use of either contiguous or non-contiguous CCs which can all be part of the same frequency band (intra-band carrier aggregation) or may be part of different frequency bands (inter-band carrier aggregation).

When carrier aggregation is used the base station effectively provides a group of serving cells, each cell of the cell group corresponding to a different respective CC. The group of cells comprises a main serving cell generally known as the primary cell (PCell) corresponding to a primary CC (PCC) and at least one further cell known as a secondary cell (SCell) corresponding to a secondary CC (SCC). It will be appreciated that a CC can be thought of as comprising an UL/DL CC pair (for frequency division duplex, FDD) or as being a bidirectional carrier (for time division duplex, TDD).

When CA is configured, the UE has a single radio resource control (RRC) connection with the network. At RRC connection establishment/re-establishment/handover, the PCell is the initial serving cell, and this PCell provides the non-access stratum mobility information and provides the security input. Once the initial RRC connection is established via the PCell, one or more SCells can be configured to form together with the PCell a set of serving cells (i.e. the associated SCC is aggregated with the PCC).

The configured set of serving cells for a UE therefore always consists of one PCell and one or more SCells.

The reconfiguration, addition, and removal of SCells can be performed by RRC. At intra-NR handover and during connection resume from an RRC inactive state, the network can also add, remove, keep, or reconfigure SCells for usage with a target PCell. When adding a new SCell, dedicated RRC signalling is used for sending all required system information of the SCell i.e. while in connected mode. Thus, UEs need not acquire broadcast system information directly from the SCells.

Both LTE and 5G NR support dual connectivity in which a device is connected via two cells simultaneously. In dual connectivity a multiple reception/transmission capable UE in an RRC connected mode can use the radio resource of two distinct schedulers, located in two base stations namely a master base station and a secondary base station connected via a non-ideal back-haul over a base station to base station interface (e.g. an X2, Xn or similar). Dual connectivity provides for a number of different shared communication scenarios including, for example: the splitting of a communication bearer may between two or more base stations or network access points; user-plane aggregation where a device can transmit and/or receive data to/from different base stations; separation of control plane and user plane between different base stations; separation of uplink and downlink transmissions between different base stations; and/or the like.

Dual connectivity can be used in multi-radio access technology (RAT) scenarios (MR-DC) in which the master and secondary base stations operate using different RATs. For example dual connectivity represents an enabler for early deployments of 5G non-standalone (NSA) networks in which a UE has a dual connection to the network via a E-UTRAN base station operating as a master base station and a 5G base station operating as a secondary base station. This form of dual connectivity is referred to as E-UTRAN NR dual connectivity (ENDC). In another dual connectivity scenario, a 5G base station can operate as a master base station and an E-UTRAN base station can operate as a secondary base station in what is referred to as NR E-UTRAN dual connectivity (NEDC).

Where dual connectivity is in operation with two or more base stations, the master base station and the secondary base stations may also use carrier aggregation in which case the cell group operated by a master base station is referred to as a master cell group (MCG) and the cell group the secondary base station is referred to as the secondary cell group (SCG). Where both the master and secondary base stations are operating respective cell groups, each having a respective PCell and one or more SCells, the PCell of the SCG is referred to as a PSCell to distinguish it from the PCell of the MCG.

As the 5G standards have developed a new technology, dynamic spectrum sharing (DSS), was introduced in release 15 (Rel-15) and further enhanced in Release 16 (Rel-16). DSS was introduced to allow an NR serving cell to be operated on an overlapping frequency with LTE cell. DSS effectively enables NW operators to provide an NR service area together with current LTE area by re-using LTE frequency band. Thus, DSS effectively allows operation of an NR serving cell on the same frequency band, at the same time, and in the same place, as an LTE cell. As its name suggests, in DSS, the same resources may be dynamically scheduled for use by a 5G UE at one point in time and for a 4G UE at another point in time. Thus, when there are few or no 4G UEs in an LTE cell on a given CC but many 5G UEs in a 5G cell operated on the same CC, the network can allocate more resources to 5G UEs and less resources to the 4G UEs and vice versa. As 5G UEs become more prevalent, DSS thus provides a potential migration path from LTE to NR by allowing LTE and NR to share the same carrier.

However, as the number of 5G capable devices in the network increases, ensuring sufficient scheduling capacity for 5G UEs on the shared carriers becomes a challenge. As in LTE, scheduling of the PDSCH (or PUSCH) is achieved by means of a physical downlink control channel (PDCCH). In 5G, however, the concept of a control resource set (CORESET) has been introduced. A CORESET is a set of time-frequency resources with which a UE can search for downlink control information (DCI) transmitted by a base station on a PDCCH. A CORESET is analogous to the control region at the start LTE subframes. Unlike LTE, in which the frequency domain of the control region corresponds to the total system bandwidth, the frequency domain location for CORESET is localised to a specific region in the frequency domain and has a variable width that can be set to any suitable value (in multiples of 6 resource blocks where each resource block comprises 12 subcarriers in the frequency domain).

A base station may transmit control information, such as information for scheduling the time and/or frequency resources for data communicated via a PDSCH or PUSCH, for a specific UE in a PDCCH that uses the resources of a UE specific CORESET defined for that UE. The PDCCH is made up of a number of control channel elements (CCEs) depending on the required aggregation level. Each CCE comprises a set of time/frequency resource comprising bundles of resource element groups, each group comprising a number of resource elements. Allowing different UEs to be assigned different resource sets for their dedicated PDCCH signalling reduces but does not eliminate the probability of PDCCH blocking events in which there are no CCEs free for scheduling a given UE, at a particular aggregation level, in that UEs search space.

A number of different DCI formats can be used for transmission on a PDCCH, depending on the nature of the control information being transmitted, and the transmitted format is unknown to the UE in advance. Accordingly, the UE typically needs to make multiple blind attempts to detect a DCI format in a set of resources representing a possible location for receiving a PDCCH (a PDCCH 'candidate').

The number of available PDCCH resources for NR UE on serving cell operating DSS will, however, be limited since NR resources have to avoid LTE resources (e.g. PDCCH, cell-specific reference signals (CRS)) on the serving cell. For example, only 1 or 2 symbols per slot may be available for NR PDCCH on a serving cell operating DSS.

In LTE, scheduling grants and scheduling assignments could be transmitted on either the same cell (i.e. on the same component carrier) as the corresponding shared channel (referred to as 'self-scheduling') or on a different cell on a different component carrier (referred to as cross-carrier scheduling). If the self-carrier scheduling is used for every serving cell in CA operation, the UE is required to monitor PDCCH on every serving cell. To reduce PDCCH monitoring effort and to increase available resources for PDSCH/PUSCH on some of serving cells, therefore, cross-carrier scheduling is also supported in NR in a similar manner to LTE. For example, in current Rel-15/16 framework, a PDCCH can schedule PDSCH on only one cell using DCI formats 1-0/1-1/1-2. In the case of self-carrier scheduling, the PDCCH and PDSCH are received on the same serving cell. For cross-carrier scheduling, a PDCCH is received on a 'scheduling cell' (cell A) and the corresponding PDSCH may be received on a 'scheduled cell' which may be same as the scheduling cell (cell A) or can be another cell (cell B).

SUMMARY OF INVENTION

Technical Problem

For the current Rel-15/16, there are a few PDCCH monitoring related UE capabilities depending in the at least one feature group (FG) supported by the UE (see, for example, 3GPP TR 38.822):

For feature group 3-1 ('Basic PDCCH monitoring') the UE can:

- Process one unicast DCI scheduling DL and one unicast DCI scheduling UL per slot per scheduled CC for FDD; and/or
- Process one unicast DCI scheduling DL and 2 unicast DCI scheduling UL per slot per scheduled CC for TDD For feature group 3-5b ('Span based PDCCH monitoring') the UE can for the set of monitoring occasions which are within the same span:

- Process one unicast DCI scheduling DL and one unicast DCI scheduling UL per scheduled CC, per monitoring occasion, across the set of monitoring occasions for FDD;
- Process one unicast DCI scheduling DL and two unicast DCI scheduling UL per scheduled CC, per monitoring occasion, across the set of monitoring occasions for TDD; and/or
- Process two unicast DCI scheduling DL and one unicast DCI scheduling UL per scheduled CC, per monitoring occasion, across the set of monitoring occasions for TDD.

For feature group 11-2b ('Rel-16 eURLLC enhanced span based PDCCH monitoring') the UE can:

- Process one unicast DCI scheduling DL and one unicast DCI scheduling UL per scheduled CC, per monitoring occasion, across the set of monitoring occasions for FDD;
- Process one unicast DCI scheduling DL and two unicast DCI scheduling UL per scheduled CC, per monitoring occasion, across the set of monitoring occasions for TDD; and/or
- Process two unicast DCI scheduling DL and one unicast DCI scheduling UL per scheduled CC, per monitoring occasion, across the set of monitoring occasions for TDD.

Whilst the possibility of cross-carrier scheduling provides some flexibility, cross-carrier scheduling has, historically, been restricted to scheduling from a PDCCH on the PCell (or PSCell for an SCG during dual connectivity) to a shared channel on an SCell. For DSS, however, since the PCell for the UE is likely to be operated on the DSS carrier (i.e., the same carrier that is being used for the cell serving LTE users) the resources available for cross-carrier scheduling in the PCell can be severely limited potentially leading to an increased probability of PDCCH blocking events.

As DSS has been developed a number of PDCCH enhancements for NR DSS (especially in FR1) have been proposed, including PDCCH enhancements for cross-carrier scheduling including cross-carrier scheduling involving PDCCH of an SCell scheduling a PDSCH (or PUSCH) on P(S)Cell. Moreover, whilst the current scheduling mechanism supports a single DCI scheduling only a PDSCH on a single cell at a time, also under consideration has been the possibility of a PDCCH of a PCell, PSCell, or SCell being able to schedule shared channel on multiple cells at the same time and it has been agreed that the number of cells that can be scheduled in this way should—at least initially—be limited to two.

There are a number of scheduling scenarios for scheduling two cells including a single-cell scheduling per DCI mechanism and a two-cell per DCI scheduling mechanism. The single-cell scheduling mechanisms involve, for example, an appropriately formatted DCI using one PDCCH transmitted on a first cell scheduling one PDSCH on that cell via self-scheduling, and another appropriately formatted DCI using another PDCCH transmitted on the same cell scheduling another PDSCH on a second cell via cross-carrier scheduling. The two-cell scheduling mechanism involves a single DCI using a PDCCH transmitted on a first cell scheduling both a PDSCH on the first cell (or another different cell) and another PDSCH on a second cell.

Whilst scheduling two cells via a single DCI, rather than two DCIs (one DCI per cell), can appear desirable in terms of improved signalling efficiency, especially because the resources available for each PDCCH may be limited, signalling via a single DCI also presents a number of technical challenges. Moreover, in order to address these challenges, it may be considered necessary to increase the DCI size. However, it is also generally desirable to minimise the impact of any such new signalling mechanism on the DCI size.

For example, in addition to keeping DCI field sizes to a minimum, there are challenges in terms of: how to avoid ambiguity between the signalling of a single cell and the signalling of multiple (two) cells; how to avoid or minimise any impact on the number of blind decoding attempts; how to avoid the need for new DCI formats if possible; how to avoid ambiguities between the base station and a UE, relating to how many shared channels have been scheduled, when a DCI is missed, regardless of whether a one or two cell DCI is used; how to avoid ambiguity in terms of subcarrier spacing (SCS) and hybrid automatic repeat request acknowledgment feedback timing; and generally how to minimise complexity especially in the event of different SCS being used in different cells.

It can be seen, therefore, that there is a need for an efficient mechanism for providing, essentially at the same time, scheduling for a shared channel (e.g. PDSCH or PUSCH) on a first cell and another shared channel (e.g. PDSCH or PUSCH) on a second cell. Providing a scheduling mechanism that uses a single DCI in a single PDCCH, transmitted in either one of the first and second cells, or in a completely a different cell, and that at least partially addresses or ameliorates the above challenges, would be particularly beneficial.

Solution to Problem

The present invention provides apparatus and methods which at least partially contributes to addressing the above need.

Aspects of the invention are set out in the appended independent claims. Optional but beneficial features are set out in the appended dependent claims.

In one example described herein there is provided a method performed by a user equipment (UE) that communicates with a radio access network in a communication system, the method comprising: communicating with a radio access network (RAN) node in a set of cells;

receiving, from the RAN node, control information for scheduling resources for a respective shared channel in each of at least two cells of the set of cells, wherein the respective control information for each of the at least two cells of the set of cells is received in a single scheduling downlink control information (DCI) transmission; and respectively communicating with the RAN node in each of the at least two cells of the set of cells using the corresponding shared channel resources scheduled via the single scheduling DCI transmission; wherein the scheduling DCI includes a DCI field, and wherein the DCI field carries information for identifying each cell, of the at least two cells of the set of cells, for which resources for a respective shared channel have been scheduled.

The DCI field may be a DCI field comprising a plurality of bits, wherein the information for identifying each cell may be in the form of a numeric value represented by the bits, the numeric value corresponding to one of a plurality of possible combinations of the at least two cells of the set of cells. The DCI field may be a DCI field comprising a plurality of bits, wherein the information for identifying each cell may be in the form of a bit sequence represented by the bits, each bit of the bit sequence corresponding to a respective cell of the at least two cells of the set of cells. The DCI field may be a three-bit DCI field.

Each of the at least two cells of the set of cells may be provided on a different respective component carrier (CC). The information for identifying each of the at least two cells of the set of cells may be configured for identifying each cell by indicating each component carrier on which a respective cell of the at least two cells of the set of cells may be provided.

The method may comprise receiving information for configuring a subset of cells, from the set of cells, that are eligible to be a cell of the at least two cells of the set of cells for which resources for a shared channel are schedulable using a single scheduling DCI transmission. The information for identifying each cell may be configured for identifying at least two cells of the configured subset of cells to be the at least two cells of the set of cells for which resources for a respective shared channel have been scheduled.

The method may comprise receiving information for configuring a set of combinations of at least two cells, from the set of cells, for which resources for a shared channel are schedulable using a single scheduling DCI transmission. The information for identifying each cell may be configured for indicating a specific combination of at least two cells from the configured set of combinations to be the at least two cells of the set of cells for which resources for a respective shared channel have been scheduled.

The scheduling DCI may use a DCI format that is configurable for single-cell scheduling of resources in a shared channel in a single cell, and for multi-cell scheduling of resources in a respective shared channel in each of at least two cells of the set of cells. The scheduling DCI may comprise a DCI field comprising an indication of whether the scheduling DCI is for single-cell scheduling or multi-cell scheduling.

The scheduling DCI may comprise a DCI field comprising downlink assignment index (DAI) information representing a counter DAI (C-DAI) that indicates an accumulated number of DCIs that have been transmitted to the UE up to a current monitoring occasion and a total DAI (T-DAI) that indicates a total number of shared channels that will be scheduled for the UE up to the current monitoring occasion.

The scheduling DCI may comprise a DCI field indicating a timing at which hybrid automatic repeat request (HARQ) feedback should be provided to the RAN node for the shared channels for which resources have been scheduled. The DCI field indicating a timing at which HARQ feedback should be provided may indicate a time relative to the timing of an earliest received of the shared channels for which resources have been scheduled. The method may further comprise providing HARQ feedback to the RAN node in accordance with said timing.

The method may comprise generating hybrid automatic repeat request (HARQ) feedback for each shared channel for which resources have been scheduled and providing the generated HARQ feedback to the RAN node. The HARQ feedback may comprise first HARQ feedback for a first shared channel in a first cell concatenated with second HARQ feedback for a second shared channel in a second cell. The HARQ feedback may be concatenated in an order corresponding to a respective index or numeric identifier associated: with each cell of the first cell and second cell; or with each component carrier of a first component carrier on which the first cell is provided, and a second component carrier on which the second cell is provided.

At least one shared channel, in the at least two cells of the set of cells, for which resources have been scheduled may be a physical downlink shared channel (PDSCH). At least one shared channel, in the at least two cells of the set of cells, for which resources have been scheduled may be a physical uplink shared channel (PUSCH). At least one shared channel, in the at least two cells of the set of cells, for which resources have been scheduled may be a physical downlink shared channel (PDSCH), and at least one other shared channel, in the at least two cells of the set of cells, for which resources have been scheduled may be a physical uplink shared channel (PUSCH). At least one shared channel, in the at least two cells of the set of cells, for which resources have been scheduled may be provided on a dynamic shared spectrum (DSS) component carrier.

The scheduling DCI may be received in a cell of the at least two cells of the set of cells. The scheduling DCI may be received in a cell that is not one of the at least two cells of the set of cells. The set of cells may comprise a primary cell and at least one secondary cell, wherein the scheduling DCI is received in the at least one secondary cell.

In one example described herein there is provided a method performed by a radio access network (RAN) node that communicates with a user equipment (UE) in a communication system, the method comprising: communicating with the UE in a set of cells; transmitting, to the UE, control information for scheduling resources for a respective shared channel in each of at least two cells of the set of cells, wherein the respective control information for each of the at least two cells of the set of cells is received in a single scheduling downlink control information (DCI) transmission; and respectively communicating with the UE in each of the at least two cells of the set of cells using the corresponding shared channel resources scheduled via the single scheduling DCI transmission; wherein the scheduling DCI includes a DCI field, and wherein the DCI field carries information for identifying each cell, of the at least two cells of the set of cells, for which resources for a respective shared channel have been scheduled.

In one example described herein there is provided a computer program product comprising instructions which, when the program is executed by a computer apparatus, cause the computer to carry out the steps of one of the above methods.

In one example described herein there is provided a user equipment (UE) for communicating with a radio access network in a communication system, the UE comprising: a controller and a transceiver, wherein the controller is configured to control the transceiver to: communicate with a radio access network (RAN) node in a set of cells; receive, from the RAN node, control information for scheduling resources for a respective shared channel in each of at least two cells of the set of cells, wherein the respective control information for each of the at least two cells of the set of cells is received in a single scheduling downlink control information (DCI) transmission; and respectively communicate with the RAN node in each of the at least two cells of the set of cells using the corresponding shared channel resources scheduled via the single scheduling DCI transmission; wherein the scheduling DCI includes a DCI field, and wherein the DCI field carries information for identifying each cell, of the at least two cells of the set of cells, for which resources for a respective shared channel have been scheduled.

In one example described herein there is provided a radio access network (RAN) node for communicating with a user equipment (UE) in a communication system, the RAN node comprising: a controller and a transceiver, wherein the controller is configured to control the transceiver to: communicate with the UE in a set of cells; transmit, to the UE, control information for scheduling resources for a respective shared channel in each of at least two cells of the set of cells, wherein the respective control information for each of the at least two cells of the set of cells is received in a single scheduling downlink control information (DCI) transmission; and respectively communicate with the UE in each of the at least two cells of the set of cells using the corresponding shared channel resources scheduled via the single scheduling DCI transmission; wherein the scheduling DCI includes a DCI field, and wherein the DCI field carries information for identifying each cell, of the at least two cells of the set of cells, for which resources for a respective shared channel have been scheduled.

In one example described herein there is provided a communication system comprising a radio access network (RAN) code as set out above and at least one UE as set out above.

Aspects of the invention extend to corresponding systems, apparatus, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the invention will now be described, by way of example, with reference to the accompanying drawings in which:

FIG. 4 is a simplified illustration of SCell to P(S) Cell cross-carrier scheduling in the telecommunication system of FIG. 1;

DESCRIPTION OF EMBODIMENTS

Overview

An exemplary telecommunication system will now be described, by way of example only, with reference to FIGS. 1 to 8.

Figure 1:
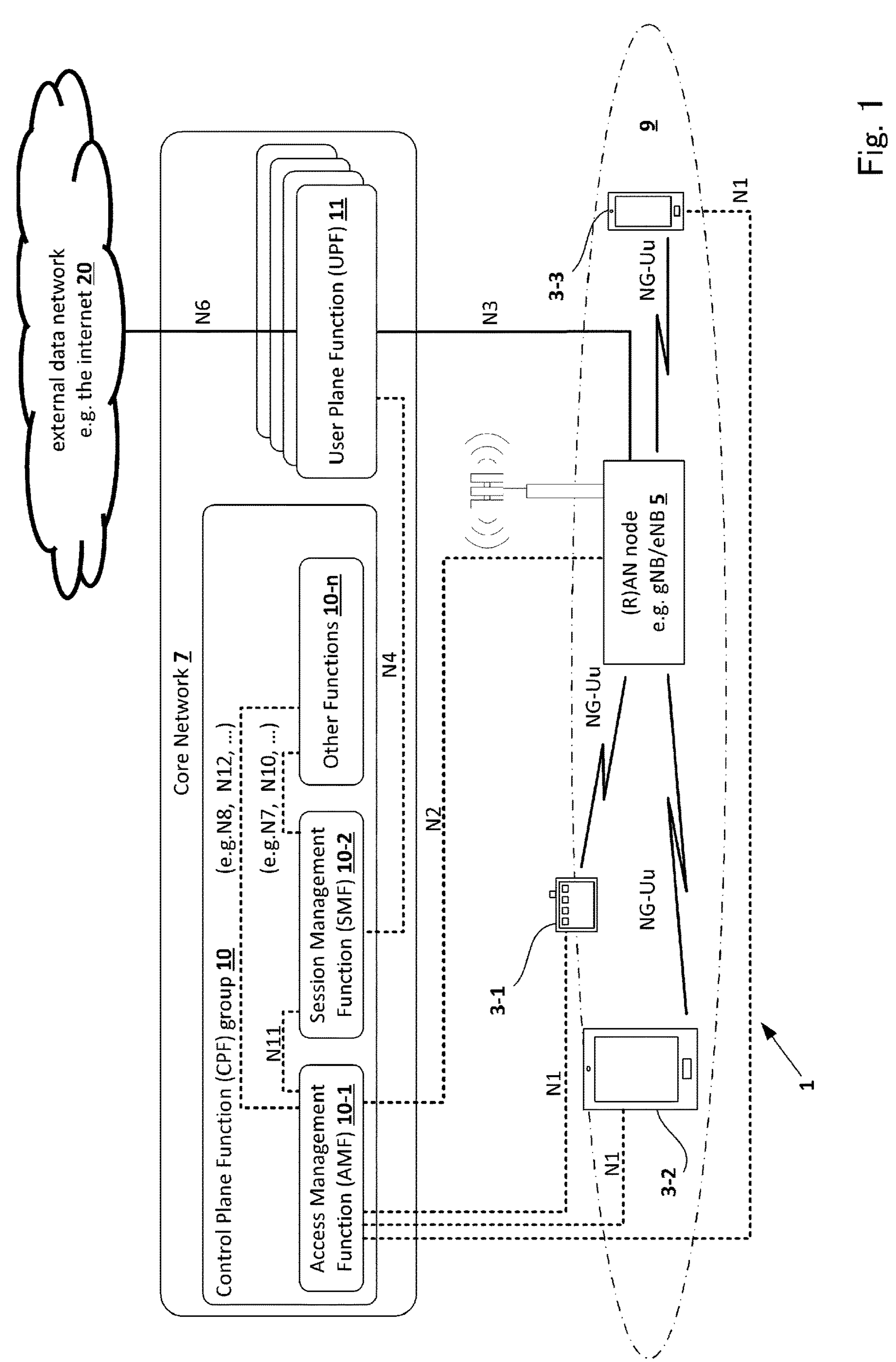
FIG. 1 schematically illustrates a mobile ('cellular' or 'wireless') telecommunication system.

FIG. 1 schematically illustrates a mobile ('cellular' or 'wireless') telecommunication system 1 to which embodiments of the present invention are applicable.

In the network 1 user equipment (UEs) 3-1, 3-2, 3-3 (e.g. mobile telephones and/or other mobile devices) can communicate with each other via base stations 5 can communicate with each other via a radio access network (RAN) node 5 that operates according to one or more compatible radio access technologies (RATs). In the illustrated example, the RAN node 5 comprises a NR/5G base station or 'gNB' 5 operating one or more associated cells 9. Communication via the base station 5 is typically routed through a core network 7 (e.g. a 5G core network or evolved packet core network (EPC)).

As those skilled in the art will appreciate, whilst three UEs 3 and one base station 5 are shown in FIG. 1 for illustration purposes, the system, when implemented, will typically include other base stations and UEs.

Each base station 5 controls the at least one associated cell either directly, or indirectly via one or more other nodes (such as home base stations, relays, remote radio heads, distributed units, and/or the like). It will be appreciated that the base stations 5 may be configured to support both 4G and 5G, and/or any other 3GPP or non-3GPP communication protocols.

The UEs 3 and their serving base station 5 are connected via an appropriate air interface (for example the so-called 'Uu' interface and/or the like). Neighbouring base stations 5 may be connected to each other via an appropriate base station to base station interface (such as the so-called 'X2' interface, 'Xn' interface and/or the like).

The core network 7 includes a number of logical nodes (or 'functions') for supporting communication in the telecommunication system 1. In this example, the core network 7 comprises control plane functions (CPFs) 10 and one or more user plane functions (UPFs) 11. The CPFs 10 include one or more Access and Mobility Management Functions (AMFs) 10-1, one or more Session Management Functions (SMFs) and a number of other functions **10-*n***.

The base station 5 is connected to the core network nodes via appropriate interfaces (or 'reference points') such as an N2 reference point between the base station 5 and the AMF 10-1 for the communication of control signalling, and an N3 reference point between the base station 5 and each UPF 11 for the communication of user data. The UEs 3 are each connected to the AMF 10-1 via a logical non-access stratum (NAS) connection over an N1 reference point (analogous to the S1 reference point in LTE). It will be appreciated, that N1 communications are routed transparently via the base station 5.

The at least one UPF 11 are connected to an external data network (e.g. an IP network such as the internet) via reference point N6 for communication of the user data.

The AMF 10-1 performs mobility management related functions, maintains the non-NAS signalling connection with each UE 3 and manages UE registration. The AMF 10-1 is also responsible for managing paging. The SMF 10-2 provides session management functionality (that formed part of MME functionality in LTE) and additionally combines some control plane functions (provided by the serving gateway and packet data network gateway in LTE). The SMF 10-2 also allocates IP addresses to each UE 3.

Figure 2:
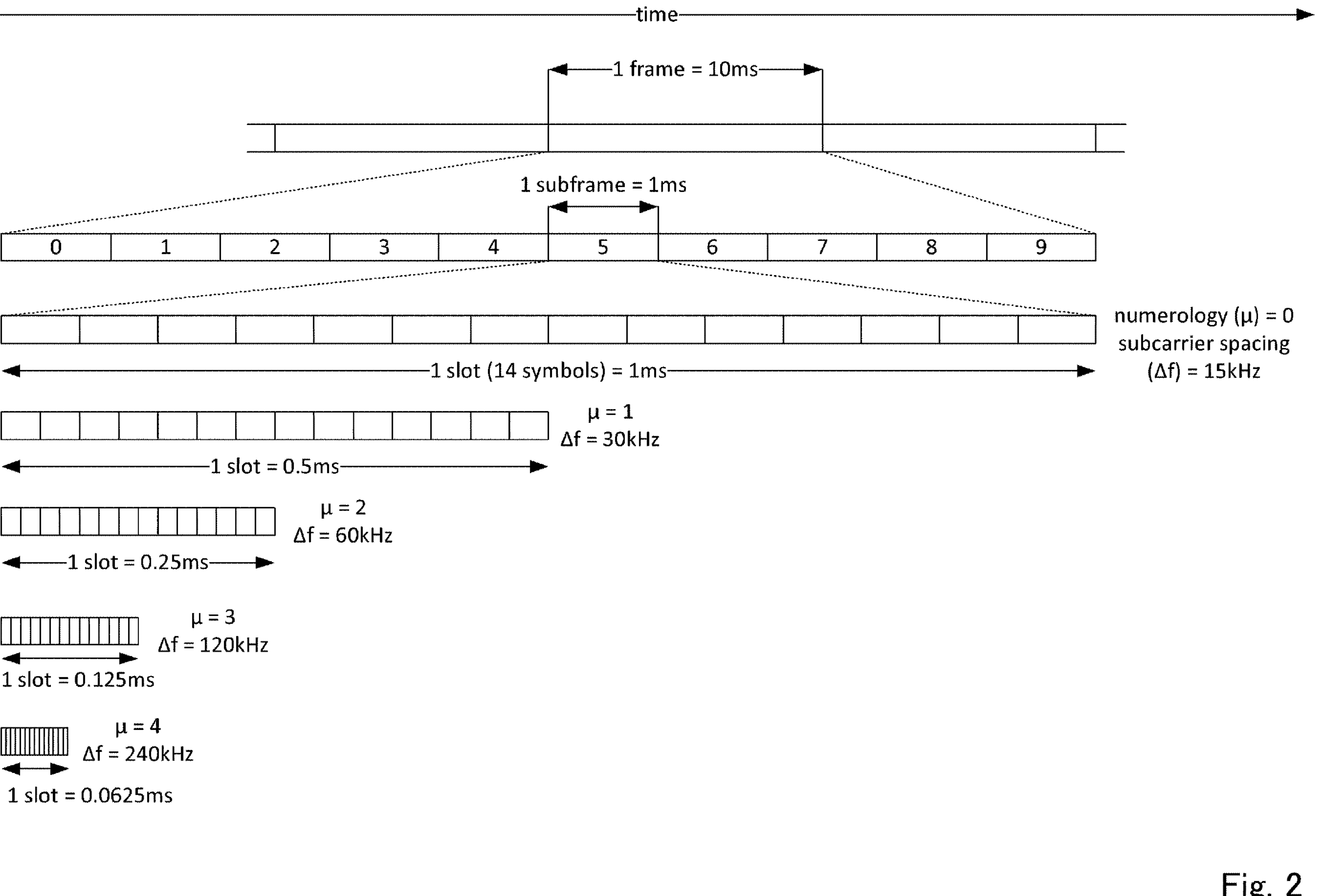
FIG. 2 illustrates a typical frame structure that may be used in the telecommunication system of FIG. 1.

Referring to FIG. 2, which illustrates the typical frame structure that may be used in the telecommunication system 1, the base station 5 and UEs 3 of the telecommunication system 1 communicate with one another using resources that are organised, in the time domain, into frames of length 10 ms. Each frame comprises ten equally sized subframes of 1 ms length. Each subframe is divided into one or more slots comprising 14 Orthogonal frequency-division multiplexing (OFDM) symbols of equal length.

As seen in FIG. 2, the telecommunication system 1 supports multiple different numerologies (subcarrier spacing (SCS), slot lengths and hence OFDM symbol lengths). Specifically, each numerology is identified by a parameter, μ, where μ=0 represents 15 kHz (corresponding to the LTE SCS). Currently, the SCS for other values of μ can, in effect, be derived from μ=0 by scaling up in powers of 2 (i.e. SCS=15×2 μkHz). The relationship between the parameter, μ, and SCS (Δf) is as shown in Table 1:

TABLE 1

5G Numerology

| μ | $\Delta f = 2^{\mu} \cdot 15$[kHz] | Number of slots per subframe | Slot length (ms) |
|---|---|---|---|
| 0 | 15 | 1 | 1 |
| 1 | 30 | 2 | 0.5 |
| 2 | 60 | 4 | 0.25 |
| 3 | 120 | 8 | 0.125 |
| 4 | 240 | 18 | 0.0625 |

Figure 3A:
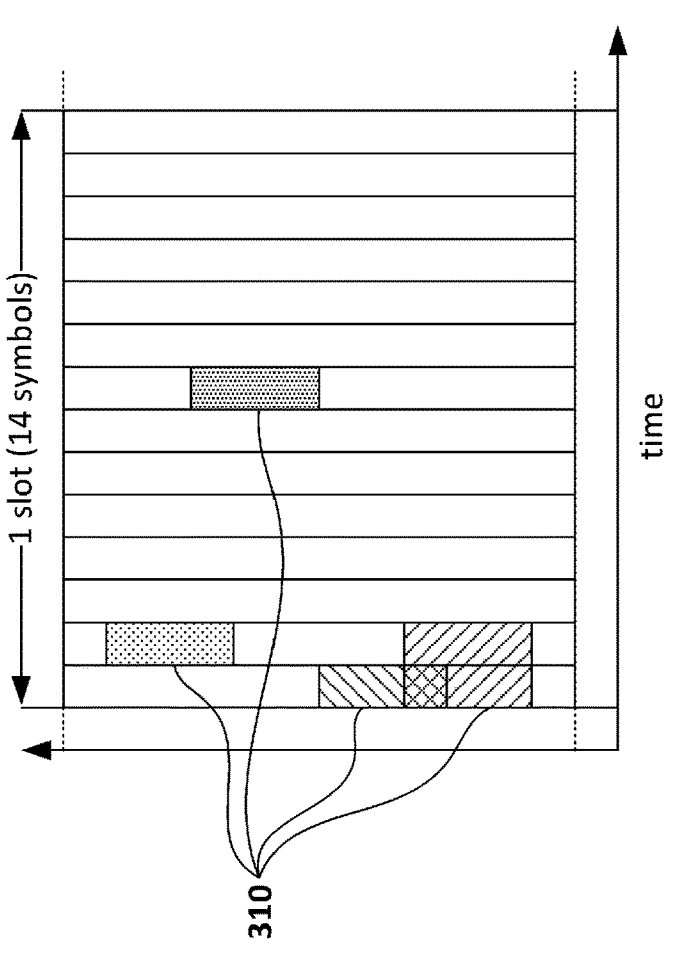
FIG. 3A is a simplified illustration of a slot comprising a plurality of CORESETS in the telecommunication system of FIG. 1.
Figure 3B:
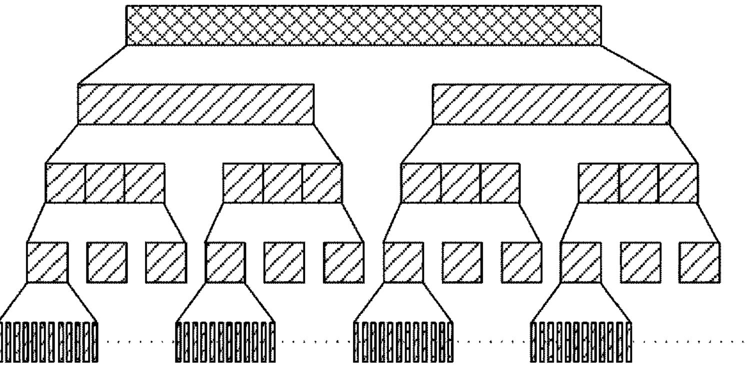
FIG. 3B is a simplified illustration of the relationship between a PDCCH candidate and the various different groupings of resources in the telecommunication system of FIG. 1.

Referring to FIG. 3A and FIG. 3B, FIG. 3A is a simplified illustration of a slot comprising a plurality of CORESETS in the telecommunication system of FIG. 1, and FIG. 3B is a simplified illustration of the relationship between a PDCCH candidate and the various different groupings of resources in the telecommunication system of FIG. 1.

As seen in FIG. 3A, the base station 5 of the telecommunication system 1, can configure a UE 3 with one or more CORESETs 310 comprising a set of time-frequency resources in which the UE 3 can search for downlink control information (DCI) transmitted by the base station 5 on a PDCCH. Each CORESET may be up to 3 OFDM symbols in length. The CORESET configured for a UE 3 will typically include one or more UE specific CORESETs configured, for example, by RRC signalling, and one or more common CORESETs configured by system information, for example, by a master information block (MIB). For example, the base station 5 is configured to use the MIB to configure an initial CORESET (CORESET 0) in which to search for a PDCCH providing scheduling for the physical downlink shared channel (PDSCH) providing system information block type 1 (SIB1).

The base station 5 may therefore transmit downlink control information (DCI) for a specific UE 3 in a PDCCH that uses the resources of a UE specific CORESET defined for that UE 3.

As seen in FIG. 3B, a PDCCH is made up of a number of (typically 1, 2, 4, 8, 16) control channel elements (CCEs) depending on the required aggregation level (L∈{1, 2, 4, 8, 16}). Each CCE is made up of a number of (typically 1, 2 or 3) resource element group bundles (REG bundles) each comprising a number of resource element groups (REGs) made up of resource elements (REs). Each RE is effectively the smallest unit of the resource grid and is made up of one subcarrier in the frequency domain and one OFDM symbol in time domain. A REG corresponds to one resource block (i.e. 12 REs/subcarriers) in the frequency domain and one OFDM symbol in time domain.

A number of different DCI formats can be used by the base station 5, depending on requirements, for transmission on a PDCCH corresponding to one of the PDCCH candidates in one of the search spaces configured for a given UE 3. For example, the base station 5 may be able to transmit DCI using one or more of the currently standardised DCI formats as set out in Table 2;

TABLE 2

| DCI Format Summary | |
|---|---|
| DCI format | Usage |
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause 9.3.1 of 3GPP TS 38.473. |
| 2_6 | Notifying the power saving information outside DRX Active Time for one or more UEs |
| 3_0 | Scheduling of NR sidelink in one call |
| 3_1 | Scheduling of LTE sidelink in one cell |

The base station 5 is configured for supporting a flexible bandwidth by performing carrier aggregation (CA) involving a group of cells, provided using corresponding component carriers (CCs) comprising a primary cell (PCell) on a primary component carrier (PCC) and one or more secondary cells (SCells), each being provided on a different respective secondary component carrier (SCC). The base station 5 is configured, when performing carrier aggregation, to perform both intra-band carrier aggregation and inter-band aggregation, and to perform aggregation involving component carriers shared with earlier generations of telecommunications equipment (e.g. 4G/LTE base stations and UEs).

To support communication on component carriers shared with other generations of telecommunications equipment, the base station is also configured for dynamic spectrum sharing (DSS) with the other generations of telecommunications equipment.

The base station 5 is also configured for supporting dual connectivity in which a UE 3 has a connection via both the cell (or group of cells) operated by the base station 5 and via a cell (or group of cells) provided by another base station. When supporting dual connectivity by a UE 3 and performing carrier aggregation, the base station 5 is able to operate the corresponding group of cells either: as a master cell group (MCG), with the other base station providing a secondary cell group (SCG); or as an SCG, with the other base station providing an MCG. It will be appreciated that when operating the group of cells as an SCG, the PCell of the SCG may be referred to as primary SCG cell (PSCell).

Beneficially, the telecommunication network 1 implements a number of advantageous procedures and features.

Cross-Carrier Scheduling from SCell to PCell

Referring to FIG. 4, which is a simplified illustration of SCell to P(S)Cell cross-carrier scheduling in the telecommunication system of FIG. 1, the base station is beneficially configured for cross-carrier scheduling a shared channel (PDSCH or PUSCH) in a PCell or PSCell 9-2 provided on a PCC that operates as a scheduled carrier, from a PDCCH in an SCell 9-1 provided on an SCC that operates as a scheduling carrier. In FIG. 4, the scheduling carrier is shown as being an NR only CC. However, whilst scheduling from an NR CC may be beneficial as there may be less pressure on the PDCCH resources available in such an NR carrier, it will be appreciated that the SCC may be provided on a carrier in an LTE frequency band, which may also be a DSS carrier. Similarly, whilst the scheduled carrier is shown as being a DSS carrier and whilst scheduling a DSS carrier in this way is particularly beneficial, the scheduled carrier may be any suitable carrier, including an NR only carrier.

Whilst not illustrated, it will be appreciated that the base station is also configured for scheduling, when necessary, a shared channel (PDSCH or PUSCH) in one or more SCells from a PDCCH in the P(S)Cell using an appropriate DCI format, for example an appropriate one of the scheduling DCI formats illustrated in Table 2.

Efficient Indication of Carriers to be Scheduled

In addition to cross-carrier scheduling from an SCell to a PCell, the base station is beneficially configured to schedule multiple shared channels by re-using the existing carrier indicator field (CIF) of an existing scheduling DCI (for example DCI formats 1-0/1-1/1-2 for PDSCH or DCI formats 0-0/0-1/0-2 for PUSCH).

Figure 5A:
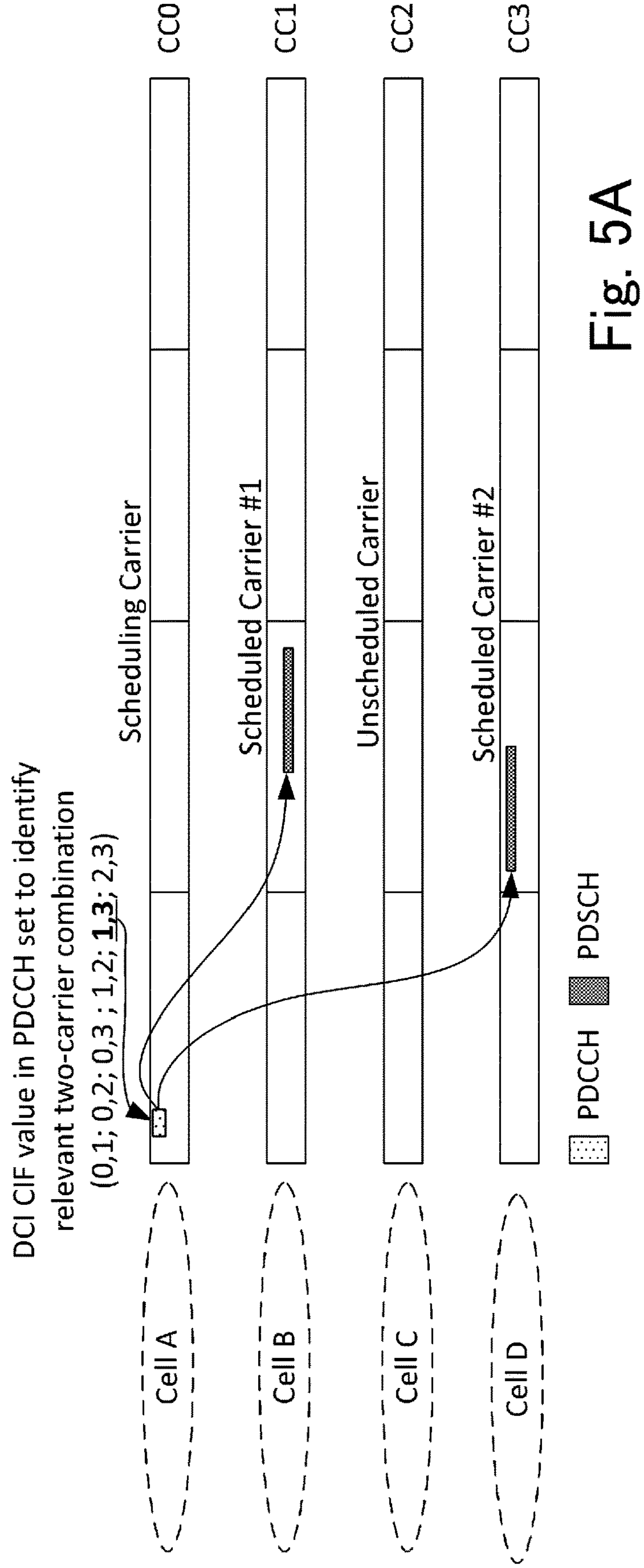
FIG. 5A is simplified illustration of multi-carrier scheduling according to one example the telecommunication system of FIG. 1.
Figure 5B:
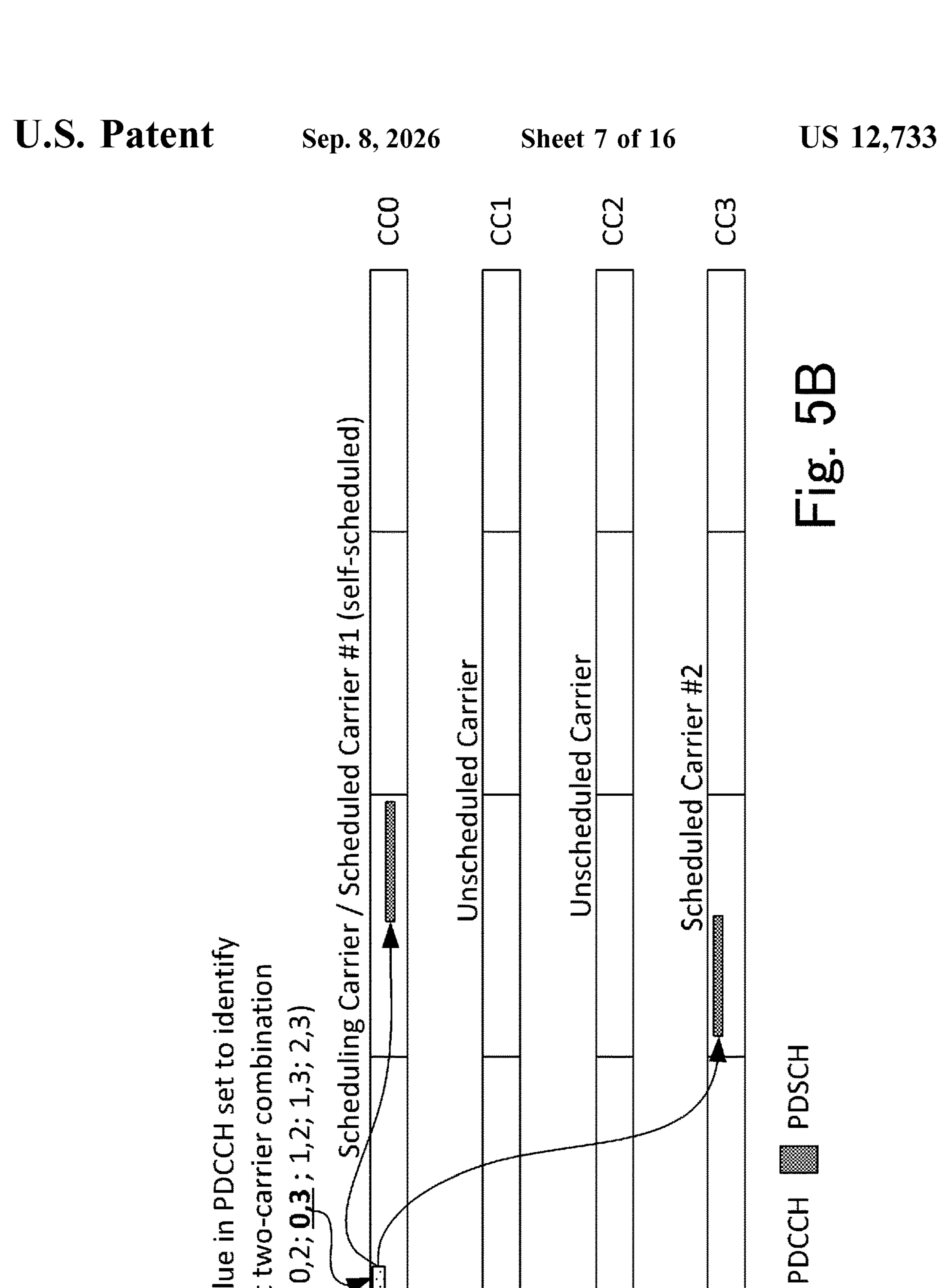
FIG. 5B is simplified illustration of multi-carrier scheduling according to one example the telecommunication system of FIG. 1.

Referring to FIG. 5A and FIG. 5B, each of which is a simplified illustration of multi-carrier scheduling according to one example, in which there are four active aggregated carriers (labelled CC0 to CC3), in one example described in more detail later, the base station 5 of telecommunication network 1 are configured to use the existing three-bit CIF to explicitly indicate one of the six possible two-carrier combinations (i.e. CC0, CC1; CC0, CC2; CC0, CC3; CC1, CC2; CC1, CC3; or CC2, CC3) and the UE 3 is configured to recognise and correctly interpret the CIF accordingly.

In FIG. 5A an example is shown in which the two scheduled carriers (CC1 and CC3 for purely illustrative purposes) are both cross-scheduled from the scheduling carrier (in this example CC0). In FIG. 5B an example is shown in which the one scheduled carrier (CC0 in this example) is the scheduling carrier and so is effectively self-scheduled and the other scheduled carrier (CC3 in this example) is cross-scheduled.

Thus, when the CIF field is used for two-cell scheduling the DCI still matches the original size of the CIF field for a one-cell DCI (three bits).

It will be appreciated that, in the example of four or fewer active carriers, the correspondence between the carrier combinations and the value of the CIF can be determined implicitly at the UE, without additional signalling, based on, for example, the frequency order of the active component carriers, the SCell index for each SCell, or the like. The correspondence between the carrier combinations and the value of the CIF can alternatively, or additionally, be (pre) configured at the UE using higher layer signalling (e.g. RRC or MAC signalling).

Whilst there may be more than four active carriers, and therefore more than eight possible two-cell combinations, not all combinations need be allowed because some two-cell combinations are less likely to need to be scheduled than others. Accordingly, in an optional enhancement to or variation on the above, in the event of more than four active carriers the base station 5 may beneficially be configured to provide, to the UE, information for mapping each CIF value (of all possible CIF values or a subset of those values) to a respective pair of active component carriers and/or cells (P(S)Cell or SCell(s)). The mapping information may be provided in any suitable form and may be stored in the UE 3 and/or base station 5 as a mapping table or the like. The mapping information may, for example, be configured at the UE 3 by higher layer (e.g. RRC and/or MAC) signalling or the like. Accordingly, up to eight different two-cell combinations could be supported in the case of more than four active carriers.

Figure 6A:
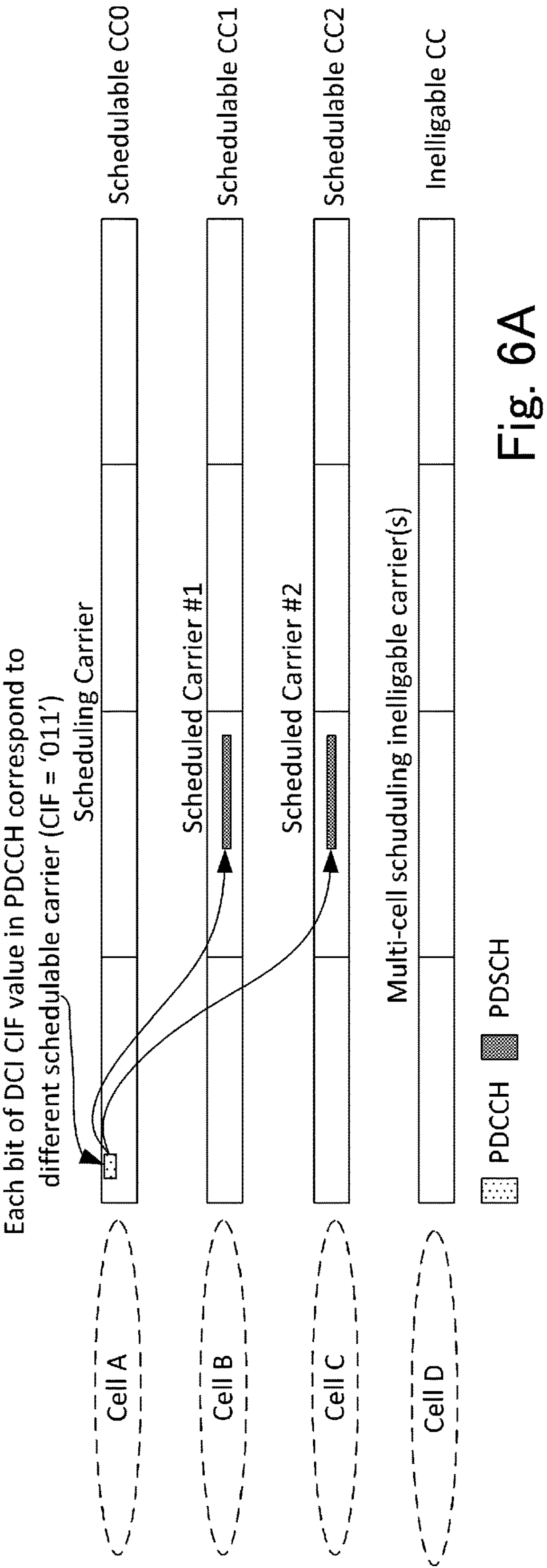
FIG. 6A is a simplified illustration of multi-carrier scheduling according to one example the telecommunication system of FIG. 1.
Figure 6B:
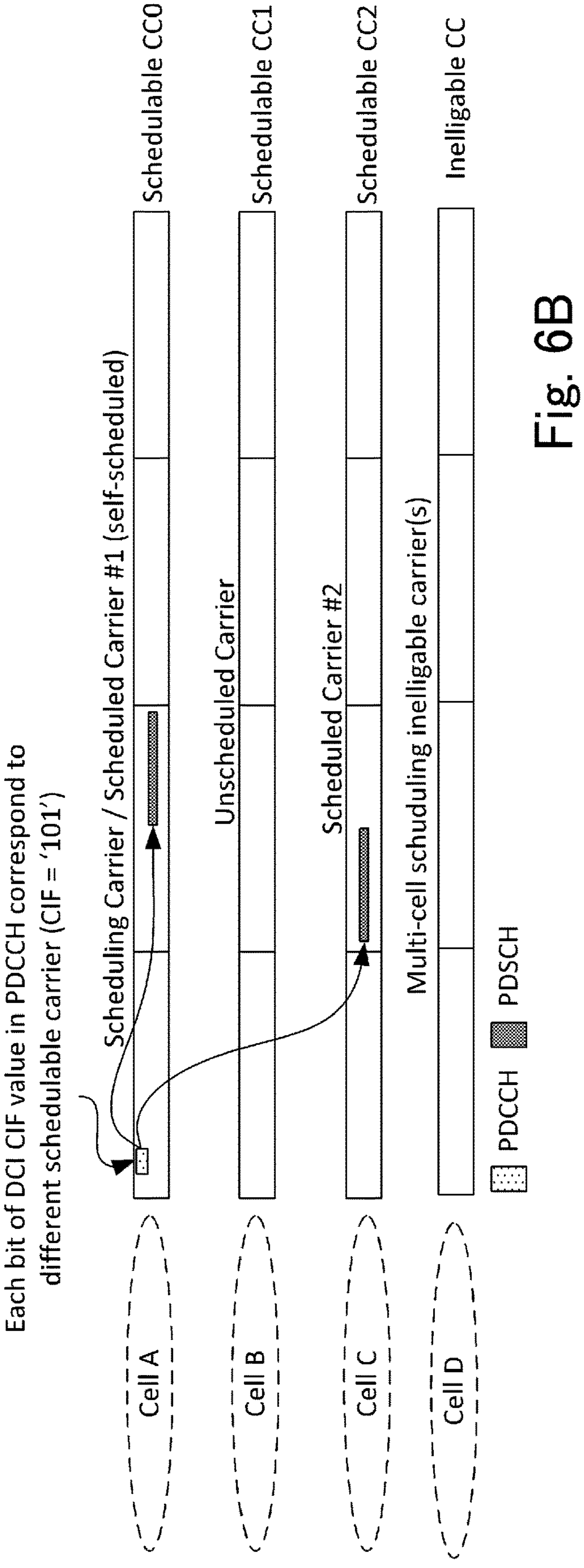
FIG. 6B is simplified illustration of multi-carrier scheduling according to one example the telecommunication system of FIG. 1.

Referring to FIG. 6A and FIG. 6B, each of which is a simplified illustration of multi-carrier scheduling according to another example. In FIG. 6A an example is shown in which the two scheduled carriers (CC1 and CC2 for purely illustrative purposes) are both cross-scheduled from the scheduling carrier (in this example CC0). In FIG. 6B an example is shown in which the one scheduled carrier (CC0 in this example) is the scheduling carrier and so is effectively self-scheduled and the other scheduled carrier (CC2 in this example) is cross-scheduled.

In the illustrated examples, whilst there are more than three active aggregated carriers, the number of carriers schedulable by means of multi-cell scheduling is deliberately constrained to three multi-cell scheduling eligible carriers (labelled CC0 to CC2). Specifically, in this example, multi-cell scheduling via a single DCI is only applicable to cases where at any one time, the UE either has a maximum of three pre-configured allowable (or multi-cell scheduling 'eligible') cells/CCs or has three or fewer aggregated active carriers. Any suitable signalling may be used to configure/reconfigure the active carriers eligible for DSS multi-cell scheduling (for example RRC signalling).

In this example, the CIF comprises a three-bit bitmap, each bit of which is used to indicate a different scheduled CC (e.g. by means of a '1' to represent a scheduled cell and a '0' otherwise, or vice versa). In this way, therefore, the CIF for a two-cell scheduling DCI can be three bits which matches the size of the CIF for one-cell DCI.

It will be understood that a similar method could be used to constrain the number of multi-cell scheduling eligible carriers to four and to use the three bits of the CIF to represent one of the six possible combinations of the four multi-cell scheduling eligible carriers as described with reference to FIG. 5A and FIG. 5B.

Advantageously, therefore, whilst in current systems, the network can indicate a cross-scheduled cell using a three-bit carrier indicator field (CIF) in the DCI sent to the UE which has three bits to indicate a scheduled cell from up to eight configured cells (or 0 bits for self-scheduling), re-purposing the CIF to support the indication of multiple scheduled cells avoids the need to add an additional CIF, or CIF like field, to the DCI. It can be seen, therefore, that this can help to minimise the impact of the new signalling capability on the size of the DCI.

Specifically, the current CIF only indicates a single scheduled cell at a time and does not support indication of multiple scheduled cells. If a single DCI scheduling a shared channel on multiple cells uses such a three-bit CIF to indicate each scheduled cell, a total of at least six bits would be required. Contrastingly, where the number of active carriers is four or fewer (or the number of schedulable carriers is restricted to four or fewer), every possible combination of the schedulable carriers can be signalled explicitly the by limiting the number of schedulable combinations of carriers to eight. The CIF used in the examples described herein allows only 3 bits of a single DCI to be used for scheduling a shared channel on each of multiple cells, even in scenarios with several SCells.

Whilst it is beneficial to reuse the CIF of an existing DCI it will be appreciated that a new dedicated multi-cell DCI format could be formed in which the CIF (or a similar field) according to one of the above examples could be used. It will also be appreciated that the above examples are equally applicable to both self-scheduling and cross-carrier scheduling use cases. Moreover, whilst the exemplary CIF based indications described with reference to FIG. 5 and FIG. 6 may represent alternatives, only one of which is used in a working system they could conceivably be implemented in the same system, for example, in different DCI formats.

It will be understood that any of these carrier indicator/cell indicator features could be implemented without the other beneficial features described herein.

Dynamic Switching Between Single and Multi-Cell Scheduling

To facilitate switching between different scheduling schemes using the same DCI format, the base station 5 is beneficially configured to include, in the scheduling DCI, a single bit single-cell/multi-cell scheduling indication, or 'flag', for indicating whether the DCI is being used for scheduling a single cell or for multi-cell scheduling of two cells, and the UE 3 is configured to recognise and correctly interpret such a flag when it is received. This flag may be an entirely new bit in the DCI format or, to minimise the impact on DCI size, may be an existing bit that has been redefined for the purpose of providing the dynamic single-cell/multi-cell indication.

Using such a flag advantageously avoids ambiguity between a single-cell scheduling DCI and a two-cell scheduling DCI and thus avoids the need for a new dedicated DCI format (although it could of course form part of a new DCI format if desired). If this flag is used its presence in the DCI can help avoid or reduce the need for additional blind decoding attempts. An example of an existing field that could be repurposed is the SCell dormancy indication field, which may for example, be used to provide a one-bit flag when the field would have previously been set to zero bits. Nevertheless, the addition of a new dedicated (one-bit) field for this purpose does not necessarily result in a larger DCI compared to the use of an existing field, and may be preferable in terms of reduced complexity to implement.

It will be understood that this multi-cell indicator feature could be implemented without the other beneficial features described herein, for example, to indicate a multi-cell scheduling DCI including a separate CIF field for indicating each carrier/cell.

Avoiding Scheduling Ambiguity Between the Base Station and UE

The UE 3 and base station 5 of the telecommunication system 1 are configured to support the hybrid automatic repeat request (HARQ) acknowledgement mechanisms common in telecommunication systems to ensure that when data units are received in error they are detected by the receiver device (UE or base station) and retransmission automatically requested. The HARQ mechanisms employed by the UE 3 and base station 5 allow feedback for multiple transport blocks received over time (slots or subframes) to be bundled together into a single HARQ codebook comprising multiple acknowledgement (ACK)/negative-acknowledgement bits multiplexed together. This codebook may be a semi-static codebook comprising feedback for all aggregated carriers or may be a dynamic codebook comprising feedback only for scheduled carriers.

Due to the potentially large size of the semi-static codebook, the dynamic codebook is the default codebook used unless the system is configured otherwise. However, whilst the dynamic codebook provides the benefit of reduced size, errors in receipt of control information (e.g. a scheduling DCI) has the potential to result in an ambiguity between what the UE 3 has identified to have been scheduled and what the base station 5 has actually scheduled. Accordingly, if the UE 3 misses a scheduling assignment, there is a possibility that a UE 3 may erroneously provide ACK/NACK feedback (codebook) for too few carriers and the base station 5 try to interpret the received ACK/NACK feedback (codebook) as if it were for the original number of carriers.

To alleviate this issue, the base station 5 is configured to use a downlink assignment index (DAI) field in the DCI containing the downlink assignment. The DAI field can comprise two parts—a counter DAI (C-DAI) and, when carrier aggregation is used, a total DAI (T-DAI). For single-cell scheduling the C-DAI in each scheduling DCI indicates, to the UE 3, the accumulated number of scheduled transmissions, for the current monitoring occasion on a carrier by carrier basis. The T-DAI, for single-cell scheduling, indicates, to the UE 3, what the total number of scheduled transmissions will be for all scheduled carriers up to the current monitoring occasion. Thus, the UE 3 can identify if a scheduling DCI has not been successfully received if the total number of received scheduling DCIs in the monitoring occasion does not match the T-DAI. If a scheduling DCI has been missed, then the UE 3 can infer which carrier was missed and add a negative acknowledgement to the corresponding position in the codebook thereby avoiding codebook misalignment between the UE 3 and the base station 5.

Figure 7:
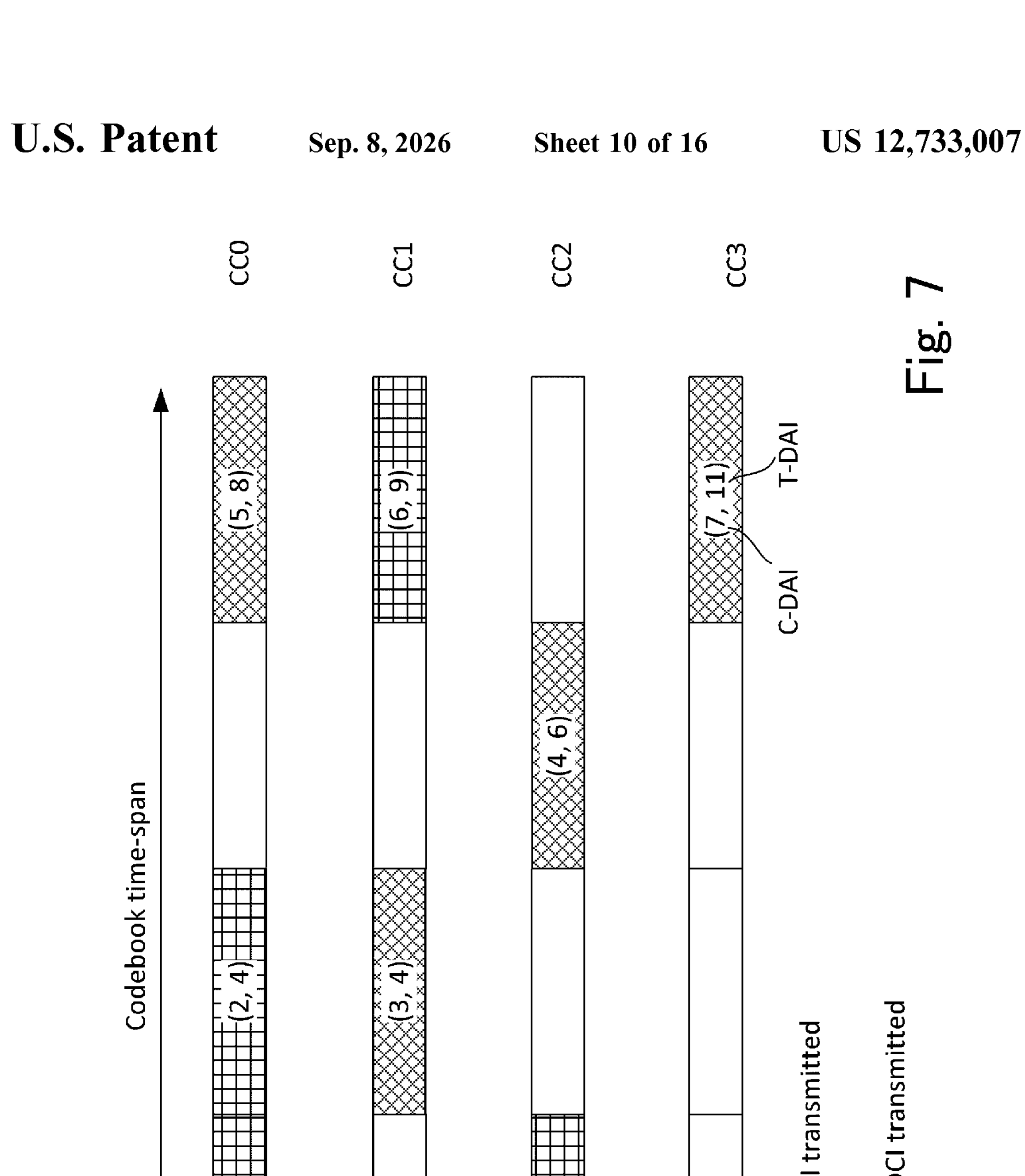
FIG. 7, is a simplified illustration of how a downlink assignment field may be used in the telecommunication system of FIG. 1.

Referring to FIG. 7, which is a simplified illustration of how a downlink assignment field may be used in the telecommunication system 1, the base station 5 is beneficially configured to include a C-DAI and a T-DAI, in the DAI field of two-carrier scheduling DCI. However, rather than increment the C-DAI by two (representing the number of scheduled carriers) the C-DAI for the two-carrier scheduling DCI is incremented by one thus representing the accumulated number of scheduling DCIs, rather than the accumulated number of scheduled carriers. The T-DAI, on the other hand, indicates the total number total number of shared channels (e.g. PDSCH) scheduled. Thus, the value of the T-DAI is increased by the total number of PDSCH scheduled each monitoring occasion (i.e. one for a single-cell scheduling DCI and two for a two-cell scheduling DCI typically used when scheduling for DSS carriers). Whilst this approach may seem counter intuitive, a UE 3 that successfully receives a two-carrier scheduling DCI can keep track of how many carriers have been scheduled and thus, what the expected T-DAI should be. However, if the UE 3 misses a two-carrier scheduling DCI, using the above approach allows the UE to infer from the C-DAI that a DCI has been missed (and which DCI has been missed) and from the T-DAI that the DCI was a two-carrier DCI.

It can be seen, therefore, that this approach beneficially avoids scheduling ambiguity between the base station 5 and the UE 3 when scheduling DCI is missed, regardless of whether it is a one or two-cell scheduling DCI.

It will be understood that this DAI feature could be implemented without the other beneficial features described herein.

Avoiding Timing Ambiguity Between the Base Station and UE

The HARQ feedback mechanisms provided for NR provide flexibility in the way HARQ feedback is provided. To facilitate this flexibility the current single-cell scheduling DCIs use a DCI format that can include a number of parameters for indicating, for example: when HARQ feedback should be provided (in a PDSCH to HARQ feedback timing indicator field of the DCI); what resources should be used for providing the feedback (in Physical Uplink Control Channel (PUCH) resource indicator field of the DCI); and that the transmission power used for PUCCH should be increased, decreased, or maintained (in a transmission power control (TPC) Command for Scheduled PUCCH field of the DCI).

Figure 8:
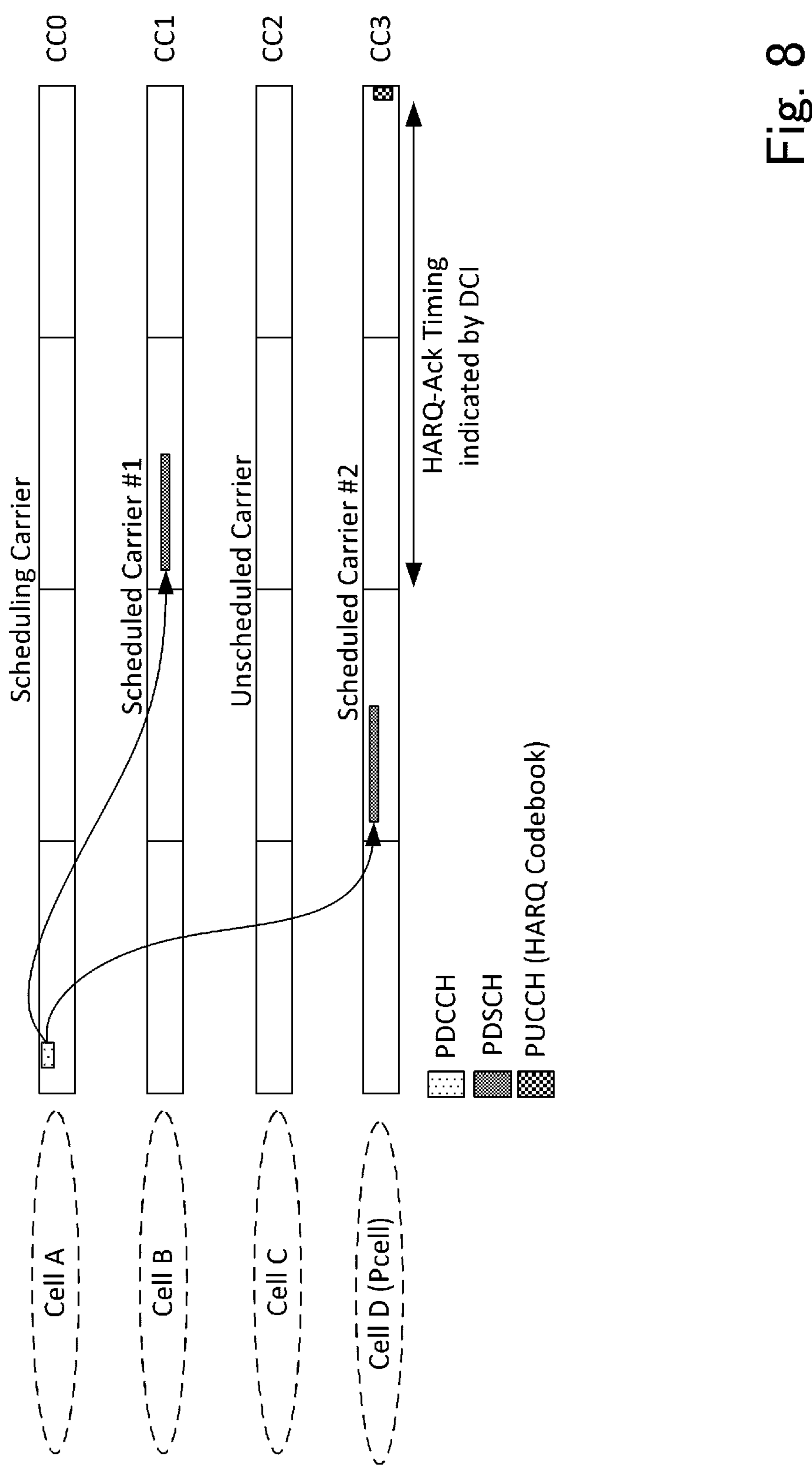
FIG. 8 is a simplified illustration of HARQ-ACK timing in the telecommunication system FIG. 1.

Referring to FIG. 8 which is a simplified illustration of HARQ-ACK timing in the telecommunication system 1, the UE 3 is configured to include the HARQ-ACK feedback corresponding to each of the two PDSCHs scheduled by a two-cell scheduling DCI in the same HARQ-ACK codebook. This allows a two-cell scheduling DCI that uses the same DCI format as the single-cell scheduling DCIs (or a new DCI format including corresponding fields) to include parameters in the PDSCH to HARQ feedback timing indicator field, PUCCH resource indicator field, and TPC command field of the DCI that can be shared for both scheduled PDSCHs. Beneficially, when determining the timing for HARQ feedback for indication via the HARQ-ACK feedback timing indicator (also known as 'K1') included in the PDSCH to HARQ feedback timing indicator field, the base station 5 selects a value for K1 that indicates a timing relative to the end of the first of the two PDSCH's and the UE 3 interprets the content of this field accordingly when a two-cell scheduling DCI is received.

This approach beneficially allows for reduced field sizes and avoids potential ambiguities in terms of SCS and HARQ-ACK feedback timing. It will be understood that this timing feature could be implemented without the other beneficial features described herein.

HARQ-ACK Codebook Structure

As indicated above, the UE 3 is configured to include the HARQ-ACK feedback corresponding to each of the two PDSCHs scheduled by a two-cell scheduling DCI in the same HARQ-ACK codebook. However, whilst the transmit timing of the first scheduled PDSCH may be later than that of the second scheduled PDSCH, the UE 3 of the telecommunication system 1 is configured the HARQ-ACK codebook by concatenating the two-cells ACK/NACKs in order of carrier identifier (or 'index') or cell identifier (or 'index') rather than based on the timing of the PDSCH. This approach helps to reduce complexity, especially in the event of different SCS for different scheduled carriers.

It will be understood that this HARQ-ACK codebook feature could be implemented without the other beneficial features described herein.

Exemplary Modification of Existing DCI Format

Whilst the two-cell scheduling CIF and other DCI fields referred to above may be sent using a new DCI format, as explained above the DCI preferably uses a slightly modified version of an existing DCI format. Table 3 illustrates how one known DCI format (in this example DCI Format 1_1) may be modified although it will be appreciated that similar modifications could be made to other known DCI formats (uplink or downlink). It will be appreciated that whilst the modified DCI format illustrated in Table 3 indicates that all the two-cell scheduling modifications described above have been taken into account it will be appreciated that the modified DCI format may only incorporate a subset of the modifications (e.g. only a modified two-cell scheduling DCI, only the modified timing indicator, only the modified DAI field, or a subset of those fields etc.).

TABLE 3

| DCI Format 1_1 | |
|---|---|
| Field | Bits |
| Identifier for Downlink Control Information (DCI) formats | 1 |
| Single-carrier/multi-carrier scheduling indicator bit | 1 |
| Carrier indicator [for single-carrier or multi-carrier scheduling] | 0, 3 |
| Bandwidth part indicator | 0, 1, 2 |
| Frequency domain resource assignment | Variable |
| Time domain resource assignment | 0, 1, 2, 3, 4 |
| Virtual Resource Block to Physical Resource Block (VRB-to-PRB) mapping | 0, 1 |
| Physical Resource Block (PRB) bundling size indicator | 0, 1 |
| Rate matching indicator | 0, 1, 2 |
| ZP CSI-RS Trigger | 0, 1, 2 |
| Modulation and coding scheme [Transport Block 1 (TB1)] | 5 |
| New data indicator [TB1] | 1 |
| Redundancy version [TB1] | 2 |
| Modulation and coding scheme [Transport Block 2 (TB2)] | 5 |
| New data indicator [TB2] | 1 |
| Redundancy version [TB2] | 2 |
| Hybrid Automatic Repeat Request (HARQ) process number | 4 |
| Downlink assignment index (with C-DAI and T-DAI set taking account of whether single-carrier or multi-carrier scheduling is used] | 0, 2, 4, 6 |
| TPC command for scheduled Physical Uplink Shared Channel (PUCCH) | 2 |
| PUCCH resource indicator | 3 |
| Physical Uplink Shared Channel to Hybrid Automatic Repeat Request feedback (PDSCH-to-HARQ_feedback) timing indicator [indicates timing relative to the end of the first PDSCH where two PDSCHs are scheduled using multi-carrier scheduling] | 0, 1, 2, 3 |
| One-shot HARQ-ACK request | 0, 1 |
| PDSCH group index | 0, 1 |
| New feedback indicator | 0, 1, 2 |
| Number of requested PDSCH group(s) | 0, 1 |
| Antenna port(s) and number of layers | 4, 5, 6 |
| Transmission configuration indication | 0, 3 |
| Sounding Reference Signal (SRS) request | 2 |
| Code Block Group (CBG) transmission information (CBGTI) | 0, 2, 4, 6, 8 |
| CBG flushing out information (CBGFI) | 0, 1 |
| Demodulation Reference Signal (DMRS) sequence initialization | 1 |
| DMRS Sequence Initialization | 0, 1 |
| Priority indicator | 0, 1 |
| ChannelAccess-CPext-CAPC | 0, 1, 2, 3, 4 |
| Minimum applicable scheduling offset indicator | 0, 1 |
| Secondary Cell (SCell) dormancy indication | 0, 1, 2, 3, 4, 5 |

User Equipment

Figure 9:
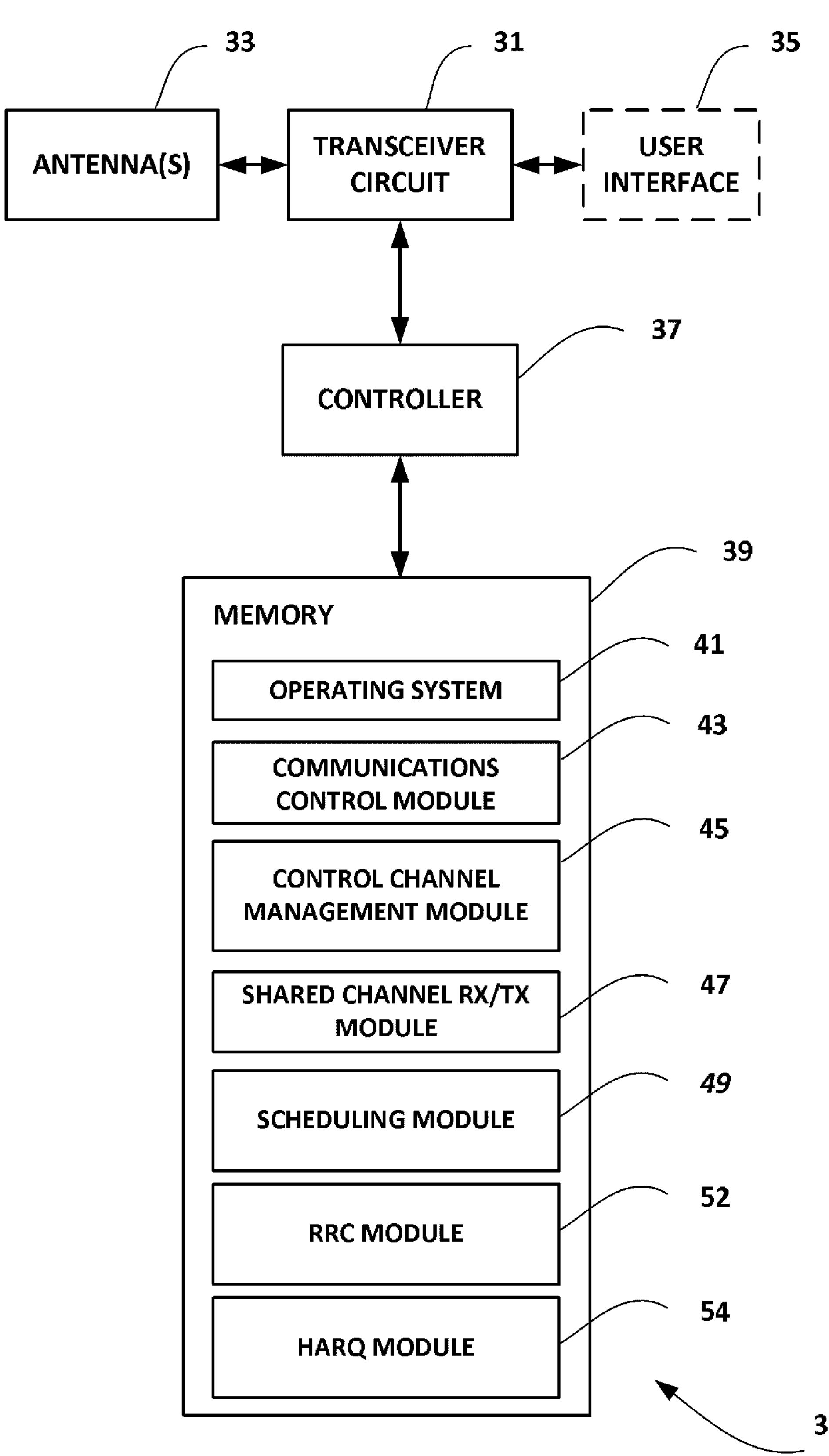
FIG. 9 is a schematic block diagram illustrating the main components of a user equipment for the telecommunication system shown in FIG. 1.

FIG. 9 is a schematic block diagram illustrating the main components of a UE 3 as shown in FIG. 1.

As shown, the UE 3 has a transceiver circuit 31 that is operable to transmit signals to and to receive signals from a base station 5 via one or more antenna 33. The UE 3 has a controller 37 to control the operation of the UE 3. The controller 37 is associated with a memory 39 and is coupled to the transceiver circuit 31. Although not necessarily required for its operation, the UE 3 might, of course, have all the usual functionality of a conventional UE 3 (e.g. a user interface 35, such as a touch screen/keypad/microphone/speaker and/or the like for, allowing direct control by and interaction with a user) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the UE 3 by, in this example, program instructions or software instructions stored within memory 39. As shown, these software instructions include, among other things, an operating system 41, a communications control module 43, a control channel management module 45, a shared channel reception/transmission module 47, a scheduling module 49, an RRC module 52, and a HARQ module 54.

The communications control module 43 is operable to control the communication between the UE 3 and its at least one serving base station 5 (and other communication devices connected to the base station 5, such as further UEs and/or core network nodes). The communications control module 43 is configured for the overall handling uplink communications via associated uplink channels (e.g. via a physical uplink control channel (PUCCH) and/or a physical uplink shared channel (PUSCH)) and for handling receipt of downlink communications via associated downlink channels (e.g. via a physical downlink control channel (PDCCH) and/or a physical downlink shared channel (PDSCH)).

The control channel management module 45 is responsible for managing the tasks related to the reception of downlink control information (e.g. DCIs) from the base station 5 and the transmission of uplink control information (e.g. HARQ feedback) to the base station 5.

The shared channel reception/transmission module 47 is responsible for managing the tasks related to the reception of downlink data from the base station 5 on a downlink shared channel (e.g. PDSCH) and the transmission of uplink data to the base station 5 on an uplink shared channel (e.g. PUSCH).

The scheduling module 49 is responsible for determining the resources scheduled by the base station 5 for the UE 3 to receive downlink communications from the base station 5 (e.g. on a PDSCH) or to transmit uplink communications to the base station (e.g. on a PUSCH).

The RRC module 52 is responsible for the reception of RRC signalling from the base station 5, and the transmission of RRC signalling to the base station 5.

The HARQ module 54 is responsible for managing HARQ related tasks such as the accumulation of ACK/NACK feedback and the related generation of dynamic or static HARQ codebooks for sending to the base station 5. The HARQ module 54 is also responsible for determining the timing at which HARQ feedback should be sent (e.g. on the PUCCH) or received (e.g. on the PDCCH). The HARQ module 54 is also responsible for the interpretation of ACK/NACK feedback received from the base station 5.

Base Station

Figure 10:
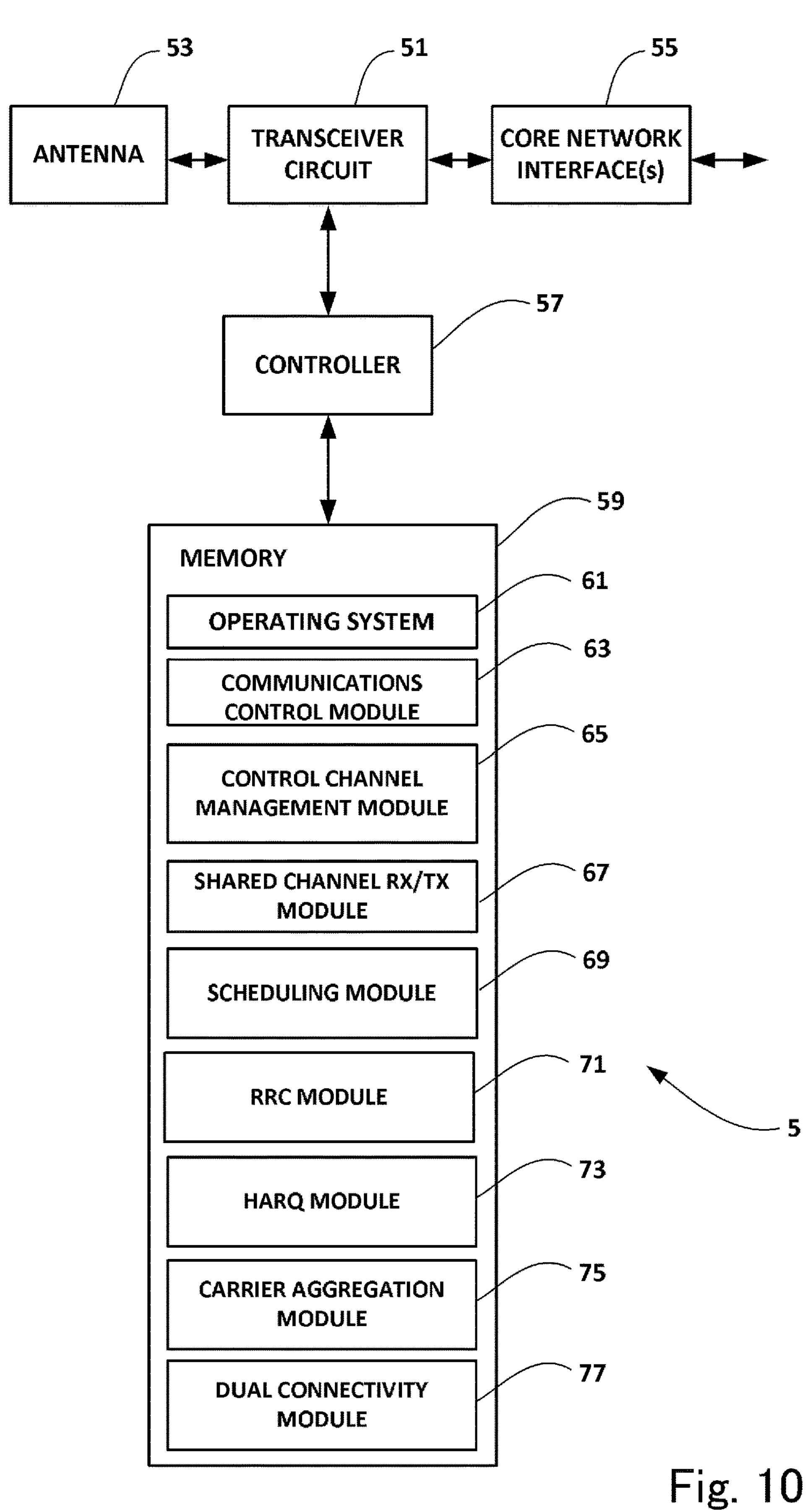
FIG. 10 is a schematic block diagram illustrating the main components of a base station for the telecommunication system shown in FIG. 1.

FIG. 10 is a schematic block diagram illustrating the main components of the base station 5 for the telecommunication system 1 shown in FIG. 1. As shown, the base station 5 has a transceiver circuit 51 for transmitting signals to and for receiving signals from the communication devices (such as UEs 3) via one or more antenna 53 (e.g. an antenna array/massive antenna), and a core network interface 55 (e.g. comprising the N2, N3 and other reference points/interfaces) for transmitting signals to and for receiving signals from network nodes in the core network 7. Although not shown, the base station 5 may also be coupled to other base stations via an appropriate interface (e.g. the so-called 'Xn' interface in NR). The base station 5 has a controller 57 to control the operation of the base station 5. The controller 57 is associated with a memory 59. Software may be pre-installed in the memory 59 and/or may be downloaded via the communications network 1 or from a removable data storage device (RMD), for example. The controller 57 is configured to control the overall operation of the base station 5 by, in this example, program instructions or software instructions stored within memory 59.

As shown, these software instructions include, among other things, an operating system 61, a communications control module 63, a control channel management module 65, a shared channel reception/transmission module 67, a scheduling module 69, an RRC module 71, an HARQ module 73, a carrier aggregation module 75, and a dual connectivity module 77.

The communications control module 63 is operable to control the communication between the base station 5 and UEs 3 and other network entities that are connected to the base station 5. The communications control module 63 is configured for the overall control of the reception of uplink communications, via associated uplink channels (e.g. via a physical uplink control channel (PUCCH) and/or a physical uplink shared channel (PUSCH)) and for handling the transmission of downlink communications via associated downlink channels (e.g. via a physical downlink control channel (PDCCH) and/or a physical downlink shared channel (PDSCH)).

The control channel management module 65 is responsible for managing the tasks related to the transmission of downlink control information (e.g. DCIs) to the UEs 3 and the reception of uplink control information (e.g. HARQ feedback) from the UEs 3.

The shared channel reception/transmission module 67 is responsible for managing the tasks related to the transmission of downlink data to the UEs 3 on a downlink shared channel (e.g. PDSCH) and the reception of uplink data from the UEs 3 on an uplink shared channel (e.g. PUSCH).

The scheduling module 69 is responsible for determining the resources to be scheduled by the base station 5 for the UE 3 to receive downlink communications from the base station 5 (e.g. on a PDSCH) or to transmit uplink communications to the base station 5 (e.g. on a PUSCH).

The RRC module 71 is responsible for the reception of RRC signalling from UE 3, and the transmission of RRC signalling to the UE 3.

The HARQ module 73 is responsible for managing HARQ related tasks such as the accumulation of ACK/NACK feedback and the related generation of HARQ codebooks for sending to the UE 3. The HARQ module 73 is also responsible for determining the timing at which HARQ feedback should be sent (e.g. on the PDCCH) or received (e.g. on the PUCCH). The HARQ module 73 is also responsible for the interpretation of ACK/NACK feedback received from the UE 3.

The carrier aggregation module 75 is responsible for managing tasks related to carrier aggregation.

The dual connectivity module 77 is responsible for managing tasks related to dual connectivity with other base stations 5.

Efficient Indication of Carriers to be Scheduled

One example of how two shared channels may be efficiently scheduled on two respective carriers using a single DCI including a three-bit CIF will now be described in more detail with reference to FIG. 11A which is a simplified illustration of a possible mapping between CIF values and scheduled active (or schedulable) carriers, and FIG. 11B which is a simplified timing diagram illustrating scheduling of PDSCHs on each of two cells.

Figures 11A, 11B:
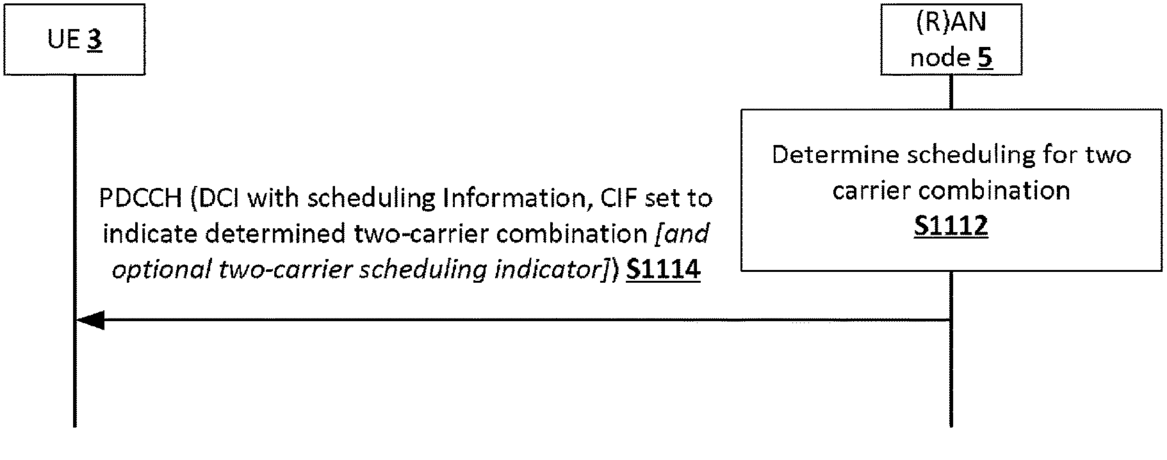
FIG. 11A is a simplified illustration of a possible mapping between carrier indicator field values and scheduled two-carrier for the telecommunication system shown in FIG. 1.
FIG. 11B is a simplified timing diagram illustrating scheduling of PDSCHs on each of two cells for the telecommunication system shown in FIG. 1.

As seen in FIG. 11A in the presence of only four active carriers (or only four schedulable carriers configured by higher layer signalling) every possible combination (i.e. CC0, CC1; CC0, CC2; CC0, CC3; CC1, CC2; CC1, CC3; or CC2, CC3) of the six possible combinations of carriers can be signalled using the three-bit CIF. It will be appreciated that whilst FIG. 11A shows a particular mapping, any appropriate mapping may be used between the pairs of scheduled carriers and the value stored in the three-bit CIF.

Referring to FIG. 11B, when the base station 5 decides to transmit data to the UE 3 using two carriers it determines the resources to be used in the two carriers at S1112. The base station 5 then transmits, at S1114, scheduling information identifying those resources together with the CIF set to a value corresponding to the combination of carriers being scheduled (e.g. an appropriate value from the mapping indicated in FIG. 11A) in a single DCI on a PDCCH. This single DCI may also include the two-carrier scheduling indicator bit/flag to indicate that the DCI is for two-cell scheduling.

Another example of how two shared channels may be efficiently scheduled on two respective carriers using a single DCI including a three-bit CIF will now be described in more detail with reference to FIG. 12A which is a simplified illustration of a possible mapping between CIF values and scheduled allowable two-carrier combinations for the telecommunication system shown in FIG. 1 and FIG. 12B which is another simplified timing diagram illustrating scheduling of PDSCHs on each of two cells.

Figure 12A:
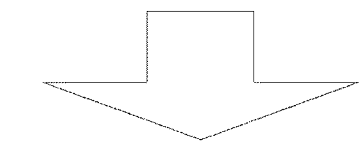
FIG. 12A is a simplified illustration of a possible mapping between carrier indicator field values and scheduled allowable two-carrier combinations for the telecommunication system shown in FIG. 1.

As seen in FIG. 12A in the presence of more than four active carriers each CIF value is mapped to a different respective carrier configuration representing an allowable combination of two carriers. It will be appreciated that whilst FIG. 12A shows a particular mapping, any appropriate mapping may be used between the allowable carrier combinations and the value stored in the three-bit CIF. It will also be appreciated that the eight allowable carrier combinations may represent any combination of active carriers and that there need not be as many as eight allowable carrier combinations.

Figure 12B:
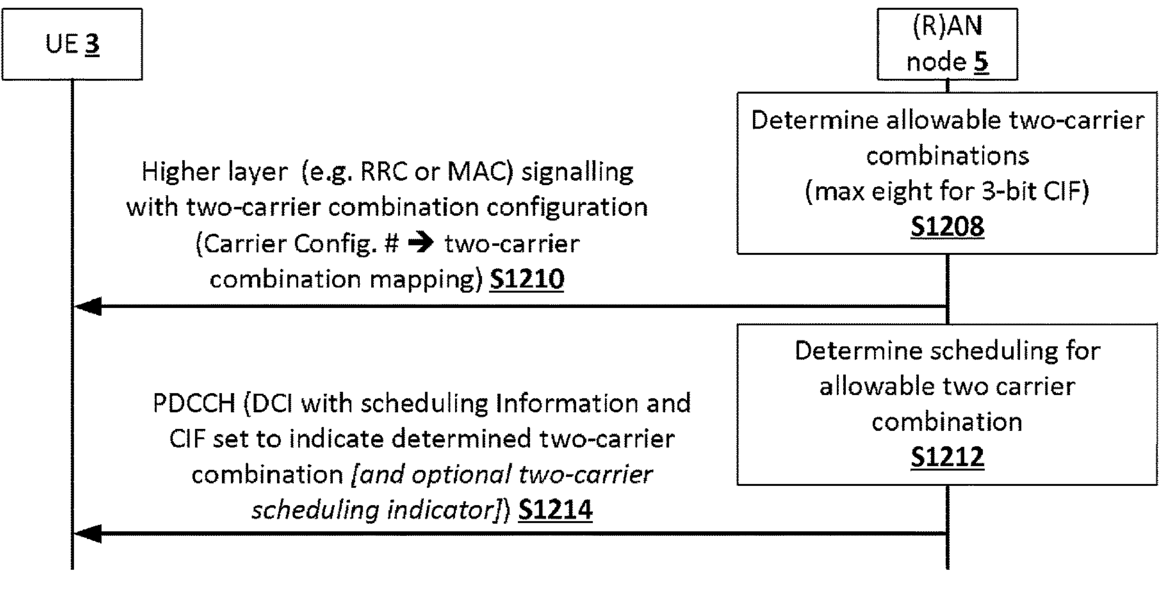
FIG. 12B is another simplified timing diagram illustrating scheduling of PDSCHs on each of two cells for the telecommunication system shown in FIG. 1.

Referring to FIG. 12B, the base station determines, as S1208 what the eight (or fewer) allowable two-carrier combinations should be and configures a mapping table as illustrated in FIG. 12B for mapping a different respective CIF value to each allowable two-carrier combination. Each carrier configuration may be represented by a carrier configuration index (as illustrated) or simply by the eight possible CIF values. Sufficient information for allowing the UE 3 to reconstruct the mapping between the CIF values and the corresponding allowable two-carrier combinations is then signalled to the UE 3 at S1210 using higher layer (e.g. RRC or MAC) signalling.

When the base station 5 decides to transmit data to the UE 3 using two carriers it determines the resources to be used in the two carriers at S1212. The base station 5 then transmits, at S1214, scheduling information identifying those resources together with the CIF set to a value corresponding to the allowable combination of carriers being scheduled (e.g. an appropriate value from the mapping indicated in FIG. 12A) in a single DCI on a PDCCH. This single DCI may also include the two-carrier scheduling indicator bit/flag to indicate that the DCI is for two-cell scheduling.

Another example of how two shared channels may be efficiently scheduled on two respective carriers using a single DCI including a three-bit CIF will now be described in more detail with reference to FIG. 13A which is a simplified illustration of a possible mapping between CIF values and two-carrier scheduling eligible component carriers and FIG. 13B which is another simplified timing diagram illustrating scheduling of PDSCHs on each of two cells.

Figures 13A, 13B:
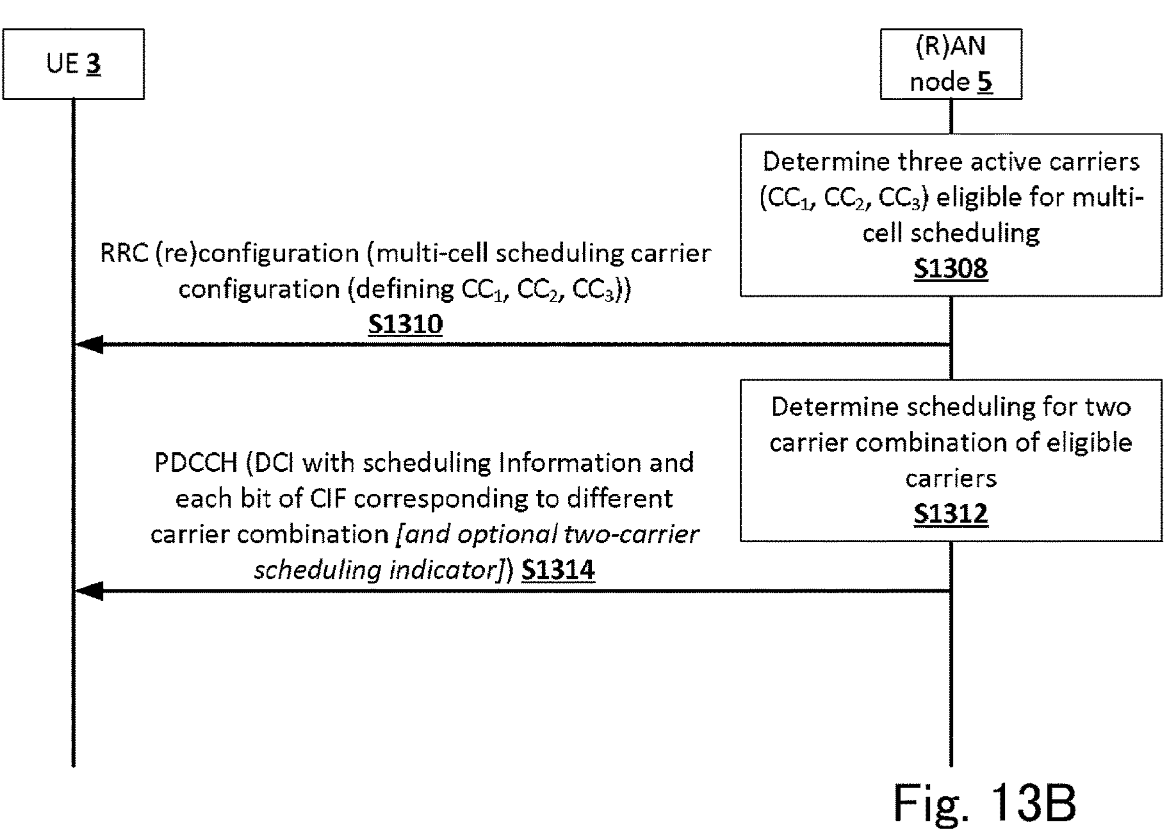
FIG. 13A is a simplified illustration of a possible mapping between carrier indicator field values and two-carrier scheduling eligible component carriers for the telecommunication system shown in FIG. 1.
FIG. 13B is another simplified timing diagram illustrating scheduling of PDSCHs on each of two cells for the telecommunication system shown in FIG. 1.

As seen in FIG. 13A in this example the number of two-carrier scheduling eligible component carriers is limited to a maximum of three component carriers. Specifically, in this example, two-cell scheduling via a single DCI is only applicable to cases where at any one time, the UE either has a maximum of three pre-configured allowable (or two-cell scheduling 'eligible') cells/component carriers or has three or fewer aggregated active carriers. As seen in FIG. 13A, each bit of the CIF is used to indicate a different scheduled CC (e.g. by means of a '1' to represent a scheduled cell and a '0' otherwise, or vice versa). It will be appreciated that any appropriate mapping may be used between the two-carrier scheduling eligible component carriers and the value stored in the three-bit CIF.

Referring to FIG. 13B, the base station determines, as S1308 what the three (or fewer) two-carrier scheduling eligible component carriers should be. The base station 5 signals information identifying these component carriers to the UE 3 at S1310 using RRC configuration (or reconfiguration) signalling.

When the base station 5 decides to transmit data to the UE 3 using two carriers it determines the resources to be used in the two carriers at S1312. The base station 5 then transmits, at S1314, scheduling information identifying those resources together with the CIF set to a value corresponding to the allowable combination of carriers being scheduled (e.g. an appropriate value from the mapping indicated in FIG. 13A) in a single DCI on a PDCCH. This single DCI may also include the two-carrier scheduling indicator bit/flag to indicate that the DCI is for two-cell scheduling.

Modifications and Alternatives

Detailed examples of various improvements have been described above. As those skilled in the art will appreciate, a number of modifications and alternatives can be made to the above examples whilst still benefiting from the inventions embodied therein.

For example, it will be appreciated that, whilst the new and beneficial features of the devices of the telecommunication network have been described, in particular, with reference to 5G/NR communication technology, the beneficial features may be implemented in the devices of a telecommunication system that uses other communication technologies such as, for example, other communication technologies developed as part of the 3GPP. For example, whilst the base station and UEs have been described as a 5G base station (gNB) and corresponding UEs it will be appreciated that the features described above may be applied to the RAN nodes (eNBs) and UEs that implement LTE/LTE-Advanced communication technology, or RAN nodes and UEs that implement other communications technologies developed using 3GPP derived communication technologies.

Moreover, whilst the PDCCH enhancements described have been influenced by the development of DSS, and are considered herein in the context of an inter-band CA scenario involving a PCell and an SCell in which at least the PCell is operated on a DSS carrier, they are, nevertheless, more generally applicable to other scenarios. The enhancements and the exemplary implementations to which the current application relates can provide advantages for cross-carrier scheduling in CA scenarios that involves a variety of combinations of DSS and non-DSS carriers, or that does not involve a DSS carrier at all. For example, the enhancements may be applicable for an intra-band CA case with multiple serving cells having same SCS in which all cells operated on non-DSS carriers, for the inter-band CA case with a PCell and more than one SCell where at least one, and possibly all, of the SCells are operated on non-DSS carriers. The exemplary implementations to which the current application relates can may also be applied in cases where the SCS for the PCell and for the at least one SCell are the same or different. Of course other combinations are not precluded.

It will also be appreciated that whilst the above examples primarily refer to scheduling of downlink shared channels (e.g. PDSCH), the features described are generally applicable to multi-cell scheduling of uplink shared channels (e.g. PUSCH) also. For example, the various DCI modifications/additions described above may be incorporated into DCI according to one of the PUSCH scheduling formats referred to in Table 2, or may be incorporated into a new dedicated DCI format.

The above features can also advantageously be adapted to the multi-cell scheduling of both an uplink shared channel in one cell/on one component carrier, and a downlink shared channel in another cell/on one component carrier (e.g. one PDSCH and one PUSCH) using the same DCI (e.g. using a three-bit carrier indication field as described above or something similar and/or one or more of the other DCI features described above). Such scheduling may require a new DCI format (e.g. a two-cell or multi-cell bi-directional scheduling format or the like) or a modification to an existing DCI to allow it to be interpreted as a bi-directional scheduling format.

Whilst the above examples primarily refer to scheduling of two shared channels only it will be appreciated that the features described above could be extended to the scheduling of more the two shared channels via the same DCI. In the above examples, the base station uses a 3GPP radio communications (radio access) technology to communicate with the UE. However, any other radio communications technology (i.e. WLAN, Wi-Fi, WiMAX, Bluetooth, etc.) can be used between the base station and the UE in accordance with the above embodiments. The above embodiments are also applicable to 'non-mobile' or generally stationary user equipment.

In the above description, the UEs and the base station are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above embodiments, a number of software modules were described. As those skilled in the art will appreciate, the software modules may be provided in compiled or un-compiled form and may be supplied to the base station, to the mobility management entity, or to the UE as a signal over a computer network, or on a recording medium. Further, the functionality performed by part or all of this software may be performed using one or more dedicated hardware circuits. However, the use of software modules is preferred as it facilitates the updating of the base station or the UE in order to update their functionalities.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like. Various other modifications will be apparent to those skilled in the art and will not be described in further detail here.

The base station may comprise a 'distributed' base station having a central unit 'CU' and one or more separate distributed units (DUs).

The User Equipment (or "UE", "mobile station", "mobile device" or "wireless device") in the present disclosure is an entity connected to a network via a wireless interface.

It should be noted that the present disclosure is not limited to a dedicated communication device and can be applied to any device having a communication function as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motorcycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyser, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IOT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices. It will be appreciated that a UE may support one or more IoT or MTC applications. Some examples of MTC applications are listed in the following table. This list is not exhaustive and is intended to be indicative of some examples of machine type communication applications.

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch exchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/ Emergency Wireless Communication Service, a community service, a video streaming service, a femto cell application service, a VOLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present document. Needless to say, these technical ideas and embodiments are not limited to the above-described UE and various modifications can be made thereto.

Various other modifications will be apparent to those skilled in the art and will not be described in further detail here.

For example, the whole or part of the exemplary embodiments disclosed above can be described as, but not limited to, the following supplementary notes.

(Supplementary Note 1)

A method performed by a user equipment (UE) configured to communicate with a radio access network in a communication system, the method comprising:

receiving, from an access network (AN) node, control information for scheduling resources for a respective shared channel in each of at least two cells of a set of cells, in a single scheduling downlink control information (DCI) transmission; and respectively communicating with the AN node in the each of the at least two cells using the resources for the respective shared channel scheduled via the single scheduling DCI transmission;

wherein the control information includes a DCI field, and wherein the DCI field carries information for identifying each cell, of the at least two cells, for which resources for the respective shared channel have been scheduled.

(Supplementary Note 2)

The method as claimed in note 1, wherein the DCI field includes a plurality of bits, and the information for identifying the each cell is in the form of a numeric value represented by the plurality of the bits, the numeric value corresponding to one of a plurality of combinations of the at least two cells.

(Supplementary Note 3)

The method as claimed in note 1, wherein the DCI field includes a plurality of bits, and the information for identifying the each cell is in the form of a bit sequence represented by the plurality of the bits, each bit of the bit sequence corresponding to a respective cell of the at least two cells.

(Supplementary Note 4)

The method as claimed in any one of notes 1 to 3, wherein the DCI field is a three-bit DCI field.

(Supplementary Note 5)

The method as claimed in any one of notes 1 to 4, wherein the each of the at least two cells is provided on a different respective component carrier (CC), and the information for identifying the each cell is configured for identifying the each cell by indicating each CC on which a respective cell of the at least two cells is provided.

(Supplementary Note 6)

The method as claimed in any one of notes 1 to 5, further comprising receiving information for configuring a subset of cells, from the set of cells, that are eligible to be a cell of the at least two cells for which resources for the shared channel are schedulable using the single scheduling DCI transmission.

(Supplementary Note 7)

The method as claimed in note 6 wherein the information for identifying the each cell is configured for identifying at least two cells of the subset of cells to be the at least two cells for which resources for the respective shared channel have been scheduled.

(Supplementary Note 8)

The method as claimed in any one of notes 1 to 5 further comprising receiving information for configuring a set of combinations of at least two cells, from the set of cells, for which resources for the shared channel are schedulable using the single scheduling DCI transmission.

(Supplementary Note 9)

The method as claimed in note 8 wherein the information for identifying the each cell is configured for indicating a specific combination of at least two cells from the set of combinations to be the at least two cells for which resources for the respective shared channel have been scheduled.

(Supplementary Note 10)

The method as claimed in any one of notes 1 to 9, wherein the control information uses a DCI format that is configurable for single-cell scheduling of resources in a shared channel in a single cell, and for multi-cell scheduling of resources in the respective shared channel in the each of at least two cells, and the control information includes a DCI field including an indication of whether the control information is for single-cell scheduling or multi-cell scheduling.

(Supplementary Note 11)

The method as claimed in any one of notes 1 to 10, wherein the control information includes a DCI field including downlink assignment index (DAI) information representing a counter DAI (C-DAI) that indicates an accumulated number of DCIs that have been transmitted to the UE up to a current monitoring occasion and a total DAI (T-DAI) that indicates a total number of shared channels that will be scheduled for the UE up to the current monitoring occasion.

(Supplementary Note 12)

The method as claimed in any one of notes 1 to 11, wherein the control information includes a DCI field indicating a timing at which hybrid automatic repeat request (HARQ) feedback should be provided to the AN node for the shared channels for which resources have been scheduled, the DCI field indicates a time relative to the timing of an earliest received of the shared channels for which resources have been scheduled, and the method further comprises providing the HARQ feedback to the AN node in accordance with the timing.

(Supplementary Note 13)

The method as claimed in any one of notes 1 to 12, further comprising:

transmitting, to the AN node, hybrid automatic repeat request (HARQ) feedback for each shared channel for which resources have been scheduled, wherein the HARQ feedback includes first HARQ feedback for a first shared channel in a first cell concatenated with second HARQ feedback for a second shared channel in a second cell, and the HARQ feedback is concatenated in an order corresponding to a respective index or numeric identifier associated: with each cell of the first cell and second cell; or with each component carrier of a first component carrier on which the first cell is provided, and a second component carrier on which the second cell is provided.

(Supplementary Note 14)

The method as claimed in any one of notes 1 to 13, wherein at least one shared channel, in the at least two cells, for which resources have been scheduled is a physical downlink shared channel (PDSCH).

(Supplementary Note 15)

The method as claimed in any one of notes 1 to 14, wherein at least one shared channel, in the at least two cells, for which resources have been scheduled is a physical uplink shared channel (PUSCH).

(Supplementary Note 16)

The method as claimed in any one of notes 1 to 15, wherein at least one shared channel, in the at least two cells, for which resources have been scheduled is a physical downlink shared channel (PDSCH), and at least one other shared channel, in the at least two cells of the set of cells, for which resources have been scheduled is a physical uplink shared channel (PUSCH).

(Supplementary Note 17)

The method as claimed in any one of notes 1 to 16, wherein at least one shared channel, in the at least two cells, for which resources have been scheduled is provided on a dynamic shared spectrum (DSS) component carrier.

(Supplementary Note 18)

The method as claimed in any one of notes 1 to 17, wherein the receiving the control information is performed in a cell of the at least two cells.

(Supplementary Note 19)

The method as claimed in any one of notes 1 to 18, wherein the receiving the control information is performed in a cell that is not one of the at least two cells.

(Supplementary Note 20)

The method as claimed in any one of notes 1 to 19, wherein the set of cells includes a primary cell and at least one secondary cell, and the receiving the control information is performed in the at least one secondary cell.

(Supplementary Note 21)

A method performed by an access network (AN) node configured to communicate with a user equipment (UE) in a communication system, the method comprising:

transmitting, to the UE, control information for scheduling resources for a respective shared channel in each of at least two cells of a set of cells in a single scheduling downlink control information (DCI) transmission; and respectively communicating with the UE in the each of the at least two cells using the resources for the respective shared channel scheduled via the single scheduling DCI transmission;

wherein the control information includes a DCI field, and wherein the DCI field carries information for identifying each cell, of the at least two cells of the set of cells, for which resources for the respective shared channel have been scheduled.

(Supplementary Note 22)

A user equipment (UE) for communicating with a radio access network in a communication system, the UE comprising:

a controller and a transceiver, wherein the controller is configured to control the transceiver to:

receive, from an access network (AN) node, control information for scheduling resources for a respective shared channel in each of at least two cells of the set of cells in a single scheduling downlink control information (DCI) transmission; and respectively communicate with the AN node in each of the at least two cells using the resources for the respective shared channel scheduled via the single scheduling DCI transmission;

wherein the control information includes a DCI field, and wherein the DCI field carries information for identifying each cell, of the at least two cells, for which resources for the respective shared channel have been scheduled.

(Supplementary Note 23)

An access network (AN) node for communicating with a user equipment (UE) in a communication system, the AN node comprising:

a controller and a transceiver, wherein the controller is configured to control the transceiver to:

transmit, to the UE, control information for scheduling resources for a respective shared channel in each of at least two cells of a set of cells in a single scheduling downlink control information (DCI) transmission; and respectively communicate with the UE in the each of the at least two cells of the set of cells using the resources for the respective shared channel scheduled via the single scheduling DCI transmission;

wherein the control information includes a DCI field, and wherein the DCI field carries information for identifying each cell, of the at least two cells, for which resources for the respective shared channel have been scheduled.

This application is based upon and claims the benefit of priority from Great Britain Patent Application No. 2104787.3, filed on Apr. 1, 2021, the disclosure of which is incorporated herein in its entirety by reference.

REFERENCE SIGNS LIST

1 Mobile telecommunication system
3 User equipment
5 Base station
7 Core network
31 Transceiver circuit
33 Antenna
35 User interface
37 Controller
39 Memory
41 Operating system
43 Communications control module
45 Control Channel Management Module
47 Shared Channel RX/TX module
49 Scheduling module
52 RRC module
54 HARQ module
51 Transceiver circuit
53 Antenna
55 Core network interface
57 Controller
59 Memory
61 Operating system
63 Communications control module
65 Control Channel Management Module
67 Shared Channel RX/TX module
69 Scheduling module
71 RRC module
73 HARQ module
75 Carrier Aggregation module
77 Dual connectivity module

The invention claimed is:

1. A method performed by a user equipment (UE), the method comprising:

receiving, in a Radio Resource Control (RRC) message, first information indicating a mapping between a plurality of numeric values and a plurality of schedulable cell combinations, wherein the plurality of schedulable cell combinations is a subset of a set of possible cell combinations;

receiving, in a single scheduling downlink control information (DCI) transmission from an access network (AN) node, control information comprising:

scheduling information identifying respective resources of a shared channel for each cell of a scheduled cell combination, and one of the plurality of numeric values;

determining the scheduled cell combination based on the one of the plurality of numeric values and the first information;

communicating with the AN node in the each cell of the scheduled cell combination using the respective resources of the shared channel; and transmitting, to the AN node, hybrid automatic repeat request (HARQ) feedback for the shared channel for the each cell of the scheduled cell combination, wherein the HARQ feedback comprises a first HARQ feedback corresponding to a first cell concatenated with a second HARQ feedback corresponding to a second cell in an order corresponding to one of indices and numeric identifiers respectively associated:

with the each cell of the scheduled cell combination; or with each of a first component carrier on which a first cell of the scheduled cell combination is provided, and a second component carrier on which a second cell of the scheduled cell combination is provided.

2. The method according to claim 1, wherein the one of the plurality of numeric values includes an indication of whether the scheduling information is for single-cell scheduling or multi-cell scheduling.

3. The method according to claim 2, wherein the control information further comprises at least one of: a HARQ feedback timing indicator field, a physical uplink control channel (PUCCH) resource indicator field, and a Transmission Power Control (TPC) command field, and wherein the transmitting the HARQ feedback comprises commonly using the at least one of the HARQ feedback timing indicator field, the PUCCH resource indicator field, and the TPC command field for both the first HARQ feedback and the second HARQ feedback.

4. The method according to claim 2, wherein the control information further comprises downlink assignment index (DAI) information comprising:

a counter DAI (C-DAI) that indicates an accumulated number of DCIs that have been transmitted to the UE in a monitoring occasion for the shared channel, and a total DAI (T-DAI) that indicates a total number of the cells scheduled by the DCIs that have been transmitted to the UE in the monitoring occasion.

5. The method according to claim 2, wherein the control information further comprises an indication of a timing at which hybrid automatic repeat request (HARQ) feedback should be provided to the AN node for the shared channel, the indication identifying the timing relative to a time of an earliest received of the shared channel, and wherein the method further comprises providing the HARQ feedback to the AN node in accordance with the timing.

6. The method according to claim 1, wherein, for at least one cell of the scheduled cell combination, the respective resources of the shared channel are provided on a dynamic shared spectrum (DSS) component carrier.

7. The method according to claim 1, wherein the scheduled cell combination comprises a primary cell and a secondary cell, and wherein the receiving the control information comprises receiving the control information in the secondary cell.

8. A method performed by an access network (AN) node, the method comprising:

transmitting, in a Radio Resource Control (RRC) message to a user equipment (UE), first information indicating a mapping between a plurality of numeric values and a plurality of schedulable cell combinations, wherein the plurality of schedulable cell combinations is a subset of a set of possible cell combinations;

transmitting, in a single scheduling downlink control information (DCI) transmission to the UE, control information comprising:

scheduling information identifying respective resources of a shared channel for each cell of a scheduled cell combination, and one of the plurality of numeric values;

wherein the scheduled cell combination is determined by the UE based on the one of the plurality of numeric values and the first information;

communicating with the UE in the each cell of the scheduled cell combination using the respective resources of the shared channel; and receiving, from the UE, hybrid automatic repeat request (HARQ) feedback for the shared channel for the each cell of the scheduled cell combination, wherein the HARQ feedback comprises a first HARQ feedback corresponding to a first cell concatenated with a second HARQ feedback corresponding to a second cell in an order corresponding to one of indices and numeric identifiers respectively associated:

with the each cell of the scheduled cell combination; or with each of a first component carrier on which a first cell of the scheduled cell combination is provided, and a second component carrier on which a second cell of the scheduled cell combination is provided.

9. A user equipment (UE) comprising:

a memory storing instructions; and at least one processor configured to process the instructions to:

receive, in a Radio Resource Control (RRC) message, first information indicating a mapping between a plurality of numeric values and a plurality of schedulable cell combinations, wherein the plurality of schedulable cell combinations is a subset of a set of possible cell combinations;

receive, in a single scheduling downlink control information (DCI) transmission from an access network (AN) node, control information comprising:

scheduling information comprising respective resources of a shared channel for each cell of a scheduled cell combination, and one of the plurality of numeric values, determine the scheduled cell combination based on the one of the plurality of numeric values and the first information;

communicate with the AN node in each cell of the scheduled cell combination using the respective resources of the corresponding shared channel; and transmit, to the AN node, hybrid automatic repeat request (HARQ) feedback for the shared channel for the each cell of the scheduled cell combination, wherein the HARQ feedback comprises a first HARQ feedback corresponding to a first cell concatenated with a second HARQ feedback corresponding to a second cell in an order corresponding to one of indices and numeric identifiers respectively associated:

with the each cell of the scheduled cell combination; or with each of a first component carrier on which a first cell of the scheduled cell combination is provided, and a second component carrier on which a second cell of the scheduled cell combination is provided.

10. An access network (AN) node comprising:

a memory storing instructions; and at least one processor configured to process the instructions to:

transmit, in a Radio Resource Control (RRC) message to a user equipment (UE), first information indicating a mapping between a plurality of numeric values and a plurality of schedulable cell combinations, wherein the plurality of schedulable cell combinations is a subset of a set of possible cell combinations;

transmit, in a single scheduling downlink control information (DCI) transmission to the UE, control information comprising:

scheduling information identifying respective resources of a shared channel for each cell of a scheduled cell combination, and one of the plurality of numeric values;

wherein the scheduled cell combination is determined by the UE based on the one of the plurality of numeric values and the first information;

communicate with the UE in the each cell of the scheduled cell combination using the respective resources of the shared channel; and receive, from the UE, hybrid automatic repeat request (HARQ) feedback for the shared channel for the each cell of the scheduled cell combination, wherein the HARQ feedback comprises a first HARQ feedback corresponding to a first cell concatenated with a second HARQ feedback corresponding to a second cell in an order corresponding to one of indices and numeric identifiers respectively associated:

with the each cell of the scheduled cell combination; or with each of a first component carrier on which a first cell of the scheduled cell combination is provided, and a second component carrier on which a second cell of the scheduled cell combination is provided.

* * * * *